(12) United States Patent
Dhawan et al.

(10) Patent No.: US 11,084,974 B2
(45) Date of Patent: Aug. 10, 2021

(54) USE OF MULTIPLE CHARGED CATIONIC COMPOUNDS DERIVED FROM POLYAMINES FOR CLAY STABILIZATION IN OIL AND GAS OPERATIONS

(71) Applicant: ChampionX USA Inc., Sugar Land, TX (US)

(72) Inventors: Ashish Dhawan, Saint Paul, MN (US); Kellen Harkness, Saint Paul, MN (US); Carter M. Silvernail, Saint Paul, MN (US); Keith A. Monk, Saint Paul, MN (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 16/554,805

(22) Filed: Aug. 29, 2019

(65) Prior Publication Data

US 2020/0071602 A1  Mar. 5, 2020

Related U.S. Application Data

(60) Provisional application No. 62/724,365, filed on Aug. 29, 2018.

(51) Int. Cl.
*C09K 8/60* (2006.01)
*C09K 8/68* (2006.01)
(Continued)

(52) U.S. Cl.
CPC .............. *C09K 8/608* (2013.01); *C09K 8/035* (2013.01); *C09K 8/467* (2013.01); *C09K 8/588* (2013.01);
(Continued)

(58) Field of Classification Search
CPC ........ C09K 8/607; C09K 8/608; C09K 8/035; C09K 8/588; C09K 8/467; C09K 8/74;
(Continued)

(56) References Cited

U.S. PATENT DOCUMENTS 4,075,136 A * 2/1978 Schaper .................. A61K 8/84
428/511
4,166,894 A * 9/1979 Schaper .................. A61K 8/84
528/271
(Continued)

FOREIGN PATENT DOCUMENTS

CN    101972612 A    2/2011
CN    102675535 A    9/2012
(Continued)

OTHER PUBLICATIONS

Zhang, et al. Controllable Self-Assembly of Amphiphilic Dendrimers on a Silica Surface: The Effect of Molecular Topological Structure and Salinity, Oct. 5, 2016, The Journal of Physical Chemistry, 8, pp. 10990-10999 (Year: 2016).*
(Continued)

*Primary Examiner* — Angela M DiTrani Leff
(74) *Attorney, Agent, or Firm* — McKee, Voorhees & Sease, PLC

(57) ABSTRACT

Methods of using specific multiple charged cationic compounds, which are derived from polyamines through an aza-Michael addition with an α, β-unsaturated carbonyl compound, in a clay treatment composition to reduces clay swelling, clay migration, and sludge formation in a subterranean formation in oil and gas operations are provided. The disclosed methods or compositions are found to be more effective than those methods or compositions including commonly used for reducing clay swelling, clay migration, and sludge formation.

24 Claims, 2 Drawing Sheets

(51) Int. Cl.
| | |
|---|---|
| C09K 8/74 | (2006.01) |
| C09K 8/035 | (2006.01) |
| C09K 8/594 | (2006.01) |
| C09K 8/588 | (2006.01) |
| E21B 33/138 | (2006.01) |
| C09K 8/467 | (2006.01) |

(52) U.S. Cl.
CPC .............. *C09K 8/594* (2013.01); *C09K 8/68* (2013.01); *C09K 8/74* (2013.01); *E21B 33/138* (2013.01); *C09K 2208/12* (2013.01)

(58) Field of Classification Search
CPC ...... C09K 8/68; C09K 8/594; C09K 2208/12; E21B 33/138
See application file for complete search history.

(56) References Cited

U.S. PATENT DOCUMENTS

| | | | |
|---|---|---|---|
| 4,259,217 | A | 3/1981 | Murphy |
| 4,355,071 | A * | 10/1982 | Chang .................... B05D 7/532 427/386 |
| 5,097,904 | A | 3/1992 | Himes |
| 5,192,798 | A | 3/1993 | Aiken et al. |
| 5,342,530 | A | 8/1994 | Aften et al. |
| 5,399,746 | A | 3/1995 | Steiger et al. |
| 5,614,616 | A | 3/1997 | Buysch et al. |
| 5,738,795 | A | 4/1998 | Chen |
| 6,054,054 | A | 4/2000 | Robertson et al. |
| 6,503,880 | B1 | 1/2003 | Skold et al. |
| 6,797,785 | B1 | 9/2004 | Hund et al. |
| 6,881,710 | B1 | 4/2005 | O'Lenick, Jr. et al. |
| 7,084,129 | B1 | 8/2006 | Smith et al. |
| 7,507,399 | B1 | 3/2009 | O'Lenick, Jr. |
| 8,631,868 | B1 | 1/2014 | Murphy et al. |
| 2001/0044393 | A1 | 11/2001 | Peterson, Jr. et al. |
| 2002/0155978 | A1 | 10/2002 | Man et al. |
| 2004/0235677 | A1 | 11/2004 | Nguyen et al. |
| 2005/0215461 | A1 | 9/2005 | Gluck et al. |
| 2006/0008496 | A1 | 1/2006 | Kulkarni et al. |
| 2006/0289164 | A1 * | 12/2006 | Smith ..................... C09K 8/74 166/295 |
| 2006/0289359 | A1 | 12/2006 | Manek et al. |
| 2010/0004316 | A1 | 1/2010 | Lu et al. |
| 2010/0029530 | A1 | 2/2010 | Whiteley |
| 2010/0305014 | A1 | 12/2010 | Miralles et al. |
| 2011/0112007 | A1 | 5/2011 | Hodge et al. |
| 2012/0053111 | A1 | 3/2012 | Hodge et al. |
| 2012/0070341 | A1 | 3/2012 | Eder et al. |
| 2012/0115962 | A1 | 5/2012 | Lee et al. |
| 2012/0285690 | A1 | 11/2012 | Weaver et al. |
| 2013/0266669 | A1 | 10/2013 | Jiang et al. |
| 2014/0124454 | A1 | 5/2014 | Nichols et al. |
| 2014/0224733 | A1 | 8/2014 | Osness et al. |
| 2015/0203738 | A1 | 7/2015 | Witham et al. |
| 2015/0210913 | A1 | 7/2015 | Gupta et al. |
| 2015/0290100 | A1 | 10/2015 | Eder et al. |
| 2016/0010035 | A1 | 1/2016 | Liu et al. |
| 2016/0030315 | A1 | 2/2016 | Emiru et al. |
| 2016/0145610 | A1 | 5/2016 | Lu et al. |
| 2016/0262999 | A1 | 9/2016 | Pedersen et al. |
| 2016/0264744 | A1 | 9/2016 | Boday et al. |
| 2017/0121560 | A1 | 5/2017 | Dockery et al. |
| 2017/0233643 | A1 * | 8/2017 | Agashe .................. C09K 8/608 507/110 |
| 2017/0349543 | A1 | 12/2017 | Siegwart et al. |
| 2017/0360040 | A1 | 12/2017 | Kost et al. |
| 2018/0066211 | A1 | 3/2018 | Pickering et al. |
| 2018/0105629 | A1 | 4/2018 | Tada et al. |
| 2018/0118999 | A1 * | 5/2018 | Hikem .................... C07C 55/02 |
| 2018/0163020 | A1 | 6/2018 | Zong et al. |
| 2019/0062187 | A1 | 2/2019 | Dhawan et al. |
| 2019/0223434 | A1 | 7/2019 | Balasubramanian et al. |

FOREIGN PATENT DOCUMENTS

| | | |
|---|---|---|
| CN | 103288672 A | 9/2013 |
| CN | 102675535 B | 11/2013 |
| CN | 104130335 A | 11/2014 |
| CN | 104130351 A | 11/2014 |
| CN | 105076201 A | 11/2015 |
| CN | 105523956 A | 4/2016 |
| CN | 106172434 A | 12/2016 |
| CN | 106423269 A | 2/2017 |
| CN | 106423284 A | 2/2017 |
| CN | 106634929 A | 5/2017 |
| CN | 106946743 A | 7/2017 |
| CN | 107440935 A | 12/2017 |
| CN | 108033895 A | 5/2018 |
| CN | 108048249 A | 5/2018 |
| CN | 108938662 A | 12/2018 |
| EP | 0296441 A2 | 12/1988 |
| GB | 847321 | 9/1960 |
| GB | 1550420 A | 8/1979 |
| JP | 6116351 A | 4/1994 |
| JP | 6116898 A | 4/1994 |
| JP | 2001187751 A | 7/2001 |
| JP | 2007054710 A | 3/2007 |
| JP | 2012136504 A | 7/2012 |
| JP | 2014009177 A | 1/2014 |
| JP | 2014093768 A | 5/2014 |
| JP | 2014221859 A | 11/2014 |
| WO | 2004056843 A2 | 7/2004 |
| WO | 2012083497 A1 | 6/2012 |
| WO | 2013087287 A1 | 6/2013 |
| WO | 2014079621 A1 | 5/2014 |
| WO | 2015084304 A1 | 6/2015 |
| WO | 2016205513 A1 | 12/2016 |
| WO | WO-2016205513 A1 * | 12/2016 ......... B01D 17/0214 |
| WO | 2017003639 A2 | 1/2017 |
| WO | 2017201076 A1 | 11/2017 |
| WO | 2018112548 A1 | 6/2018 |
| WO | 2019046409 A1 | 3/2019 |

OTHER PUBLICATIONS

Zhang et al., Supporting Information, Beijing National Laboratory for Molecular Sciences, published with Controllable Self-Assembly of Amphiphilic Dendrimers on a Silica Surface, 2016 (Year: 2016).*

Fan et al., "Synthesis and Aggregation Behavior of a Hexameric Quaternary Ammonium Surfactant", Langmuir, vol. 27, pp. 10570-10579, Jul. 28, 2011.

Kawakami et al., "Antibacterial Activity of Radial Compounds with Peripheral Quaternary Ammonium Units", Transactions of the Materials Research Society of Japan, vol. 35[4], pp. 885-887, 2010.

Zhang et al., "PAMAM-Based Dendrimers with Different Alkyl Chains Self-Assemble on Silica Surfaces: Controllable Layer Structure and Molecular Aggregation", J. Phys. Chem. B, vol. 122, pp. 6648-6655, Jun. 13, 2018.

Zhou et al., "Cooperative binding and self-assembling behavior of cationic low molecular-weight dendrons with RNA molecules", Organic & Biomolecular Chemistry, vol. 4, pp. 581-585, 2006.

Brycki et al., "The biodegradation of monomeric and dimeric alkylammonium surfactants", Journal of Hazardous Materials, vol. 280, pp. 797-815, Aug. 6, 2014.

Gan et al., "Sugar-Based Ester Quaternary Ammonium Compounds and Their Surfactant Properties", Journal of Surfactants and Detergents, vol. 17, Issue 3, pp. 465-470, Jan. 3, 2014.

Negm et al., "Synthesis, Characterization and Biological Activity of Sugar-Based Gemini Cationic Amphiphiles", Journal of Surfactants and Detergents, vol. 11, Issue 3, pp. 215-221, Apr. 26, 2008.

Tan et al., "The use of quaternised chitosan-loaded PMMA to inhibit biofilm formation and downregulate the virulence-associated gene expression of antibiotic-resistant *Staphylococcus*", Biomaterials, vol. 33, Issue 2, pp. 365-377, Jan. 2012.

Zaky, Mohamad, "Biocidal Activities of Cationic Surface Active Starch and Its Transition Metal Complexes Against Different Bacterial Strains", Journal of Surfactants and Detergents, vol. 13, Issue 3, pp. 255-260, Jul. 2010.

(56) References Cited

OTHER PUBLICATIONS

Zhi et al., "Self-aggregation and antimicrobial activity of saccharide-cationic surfactants", Colloids and Surfaces A: Physicochemical and Engineering Aspects, vol. 456, pp. 231-237, Aug. 2014.

"Azamethonium", http://pubchem.ncbi.nlm.nih.gov/compound/9383, last modified Oct. 6, 2018 and accessed by Applicant Oct. 11, 2018.

Somerscales, Euan F.C., "Fundamentals of Corrosion Fouling", Experimental Thermal and Fluid Science, vol. 14, pp. 335-355, 1997.

Zielinski et al., "Synthesis of new quaternary ammonium salts for organophilization of fillers for polymeric nanocomposites", www.miesiecznikchemik.pl, 2007.

Labade et al., "Cesium fluoride catalyzed Aza-Michael addition reaction in aqueous media", Monatsh Chem., vol. 142, pp. 1055-1059, Jul. 19, 2011.

Bi et al., "Dendrimer-Based Demulsifiers for Polymer Flooding Oil-in-Water Emulsions", Energy Fuels, vol. 31. No. 5, pp. 5395-5401, Apr. 20, 2017.

Kramer et al., "Dendritic polyamines: simple access to new materials with defined treelike structures for application in nonviral gene delivery", Chembiochem, vol. 5(8), pp. 1081-1087, Aug. 6, 2004.

Miller et al., "Non-viral CRISPR/Cas gene editing in vitro and in vivo enabled by synthetic nanoparticle co-delivery of Cas9 mRNA and sgRNA", Angew Chem Int Ed Engl., vol. 56(4), pp. 1059-1063, Jan. 19, 2017.

Ning et al., "Synthesis and characterization of a novel non-polyether demulsifier", Chemical Engineer, 3 pages, 2013.

Wang et al., "A novel environment-sensitive biodegradable polydisulfide with protonatable pendants for nucleic acid delivery", Journal of Controlled Release, vol. 120, pp. 250-258, May 11, 2007.

\* cited by examiner

USE OF MULTIPLE CHARGED CATIONIC COMPOUNDS DERIVED FROM POLYAMINES FOR CLAY STABILIZATION IN OIL AND GAS OPERATIONS

CROSS-REFERENCE TO RELATED APPLICATIONS

This application claims priority under 35 U.S.C. § 119 to provisional application Ser. No. 62/724,365, filed Aug. 29, 2018, herein incorporated by reference in its entirety.

This application is also related to U.S. application Ser. No. 16/554,935, filed simultaneously herewith, which claims priority under 35 U.S.C. § 119 to provisional application Ser. No. 62/724,398, filed on Aug. 29, 2018 and titled "MULTIPLE CHARGED IONIC COMPOUNDS DERIVED FROM POLYAMINES AND COMPOSITIONS THEREOF AND USE THEREOF AS REVERSE EMULSION BREAKERS IN OIL AND GAS OPERATIONS." The entire contents of these patent applications are hereby expressly incorporated herein by reference including, without limitation, the specification, claims, and abstract, as well as any figures, tables, or drawings thereof.

FIELD OF THE INVENTION

The present disclosure relates generally to the field of using a clay treatment composition in oil and gas operations. In particular, the present disclosure relates to using a clay treatment composition comprising one or more multiple charged cationic compounds that are derived from polyamines for preventing clay swelling, clay migration and/or sludge formation in a subterranean formation in oil and gas operations. These multiple charged cationic compounds are the products of an aza-Michael Addition reaction between a polyamine and an activated olefin ($\alpha$, $\beta$-unsaturated carbonyl compound). The disclosed methods, clay treatment compositions, multiple charged cationic compounds herein are effective to prevent clay swelling, clay migration, and/or sludge formation than the methods, compositions, or compounds that are currently used in oil and gas operations.

BACKGROUND OF THE INVENTION

A majority of the oil and gas reservoirs are composed of water-sensitive clay minerals. These clay particles or clays tend to swell, migrate, and form sludge when they meet high volumes of aqueous fluid used in stimulation for oil and gas production. The clay swelling, clay migration, and/or sludge formation results in blockage of pores, thus reducing permeability and thus ultimately production of oil or gas flow, unless a stabilizer is used to prevent clay swelling, clay migration, and/or sludge formation.

Clay stabilizers are typically cationic in nature. They range from simple single charged compounds like KCl in high concentrations (2% of the stimulation fluid) to high molecular weight polymeric quaternary amines, with some other types of compounds between these extremes.

The simple single charged clay stabilizers are considered "temporary" in that they are easily washed away via ion exchange but do the job of preventing clay swelling and migration without having adverse effects to the aqueous fluid used for stimulation (stimulation fluid). The polymeric clay stabilizers are considered "permanent" in that once the polymeric clay stabilizers attach to clays in a polydentate fashion they become exceedingly difficult to be exchanged out. This affords a longer lasting protection after the stimulation fluid has flowed back.

While existing clay stabilizers are useful to prevent clay swelling, they are not idea and effective for every kind of subterranean formation. For example, organic cationic polymers can cause formation damage due to their high molecular weights. The polymeric cationic materials will plate out on the formation face as they cannot leak off into the formation matrix and hence need to be used along with temporary clay control additives like potassium chloride, ammonium chloride or choline chloride. Smaller molecular weight materials such as choline chloride and tetramethyl ammonium chloride have also been utilized as clay stabilizers but provide only temporary clay protection and can get washed away during subsequent acid or fresh water ingression.

In addition, existing clay stabilizers may interfere with or are not compatible with other ingredients in a stimulation fluid. For examples, acids or emulsifier are usually needed in a stimulation fluid, existing clay stabilizers may not function well in the presence of these ingredients. In other words, new and alternative clay stabilizer is always desired for better performance, less cost, and less environmental impact.

Accordingly, it is an objective of the present disclosure to develop new clay stabilizers having improved properties for preventing clay swell, clay migration, and sludge formation.

It is a further objective of the disclosure to develop methods and clay treatment compositions to make prevention of clay swell, migration, and sludge formation in a subterranean formation in oil and gas operations more efficient and effective.

These and other objects, advantages and features of the present disclosure will become apparent from the following specification taken in conjunction with the claims set forth herein.

BRIEF SUMMARY OF THE INVENTION

Disclosed herein are methods of using one or more multiple charged cationic compounds as a clay stabilizer in a subterranean formation in oil and gas operation. More particularly, the disclosed methods and compositions for preventing clay swell, clay migration, and sludge formation in a subterranean formation use one or more multiple charged cationic compounds derived from a polyamine and an activated olefin.

The exemplary multiple charged cationic compounds disclosed herein have a superior performance than some existing clay stabilizers for preventing clay swell, clay migration, and sludge formation in a subterranean formation in oil and gas operations. The exemplary multiple charged cationic compounds disclosed here also show an improved performance when they are used as a coagulant, water clarification, corrosion inhibition, reverse emulsion breaker (REB), antimicrobial agent in a water system or in other applications. Therefore, the disclosed clay treatment compositions or methods have an advantage of not only preventing clay swell and migration but also serving other purposes, leading to overall reduction in chemical uses, cost, and operation complexity.

In one aspect, disclosed herein is a clay treatment composition for stabilizing swellable clays and/or reducing formation of sludge in a subterranean formation, wherein the clay treatment composition comprises a compound or its salt derived from an aza-Michael Addition Reaction between a polyamine and an α, β-unsaturated carbonyl compound according to the following formula

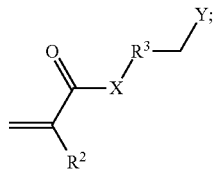

and
one or more additional clay treatment composition agents, wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear $C_1$-$C_{30}$ alkylene group; Y is —$NR_4R_5R_6^{(+)}$, or a salt thereof; and $R^4$, $R^5$, and $R^6$ are independently a $C_1$-$C_{10}$ alkyl group; wherein the compound is a multiple charged cationic compound having 2, 3, or more positive charges. In some embodiments, a use solution of the clay treatment composition reduces clay swelling, clay migration, and sludge formation.

In another aspect, disclosed herein is a method of stabilizing swellable clays and/or reducing formation of sludge in a subterranean formation, wherein the method comprises providing a clay treatment composition into a subterranean formation, wherein the clay treatment composition comprises one or more clay treatment composition agents and a compound or its salt derived from an aza-Michael Addition Reaction between a polyamine and an α, β-unsaturated carbonyl compound according to the following formula

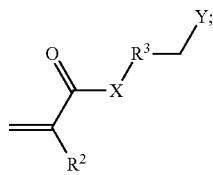

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear $C_1$-$C_{30}$ alkylene group; Y is —$NR_4R_5R_6^{(+)}$, or a salt thereof; and $R^4$, $R^5$, and $R^6$ are independently a $C_1$-$C_{10}$ alkyl group; and wherein the compound is a multiple charged cationic compound having 3 or more positive charges. In some embodiments, a use solution of the clay treatment composition reduces clay swelling, clay migration, and sludge formation.

The forgoing summary is illustrative only and is not intended to be in any way limiting. In addition to the illustrative aspects, embodiments and features described above, further aspects, embodiments, and features of the present technology will become apparent to those skilled in the art from the following drawings and the detailed description, which shows and describes illustrative embodiments of the present technology. Accordingly, the figures and detailed description are also to be regarded as illustrative in nature and not in any way limiting.

Figure 1:
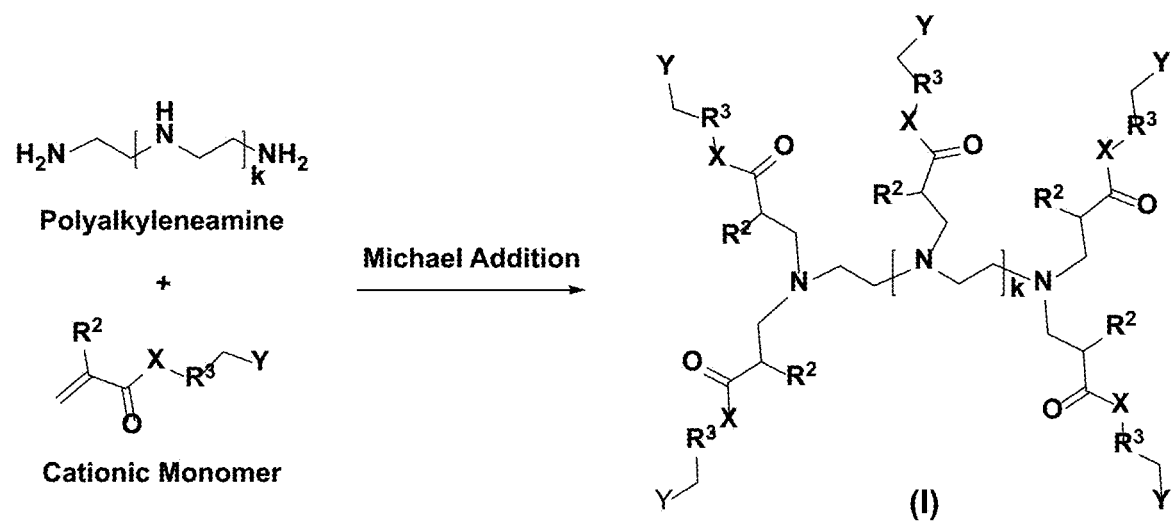
FIG. 1 shows a generic reaction scheme to produce a multiple charged cationic compound by an aza-Michael addition reaction between a linear polyethyleneimine and an α, β-unsaturated carbonyl compound.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENT

In the following detailed description, reference may made to the accompanying drawings, schemes, and structures which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Disclosed herein are methods and compositions for stabilizing swellable clays and/or reducing formation of sludge in a subterranean formation for oil and gas operations. More particularly, one or more multiple charged cationic compounds are used in clay treatment compositions for stabilizing swellable clays and/or reducing formation of sludge during oil and gas operations. These multiple charged cationic compounds are derived from polyamines through an aza-Michael Addition reaction a polyamine and an α, β-unsaturated carbonyl compound.

The embodiments of this disclosure are not limited to any specific compositions and methods which can vary and are understood by skilled artisans. It is further to be understood that all terminology used herein is for describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below. The term "about," as used herein, refers to variation in the numerical quantity that can occur, for example, through typical measuring and liquid handling procedures used for making concentrates or use solutions in the real world; through error in these procedures; through differences in the manufacture, source, or purity of the ingredients used to make the compositions or carry out the methods; and the like. The term "about" also encompasses amounts that differ due to novel equilibrium conditions for a composition resulting from a particular initial mixture. Whether or not modified by the term "about", the claims include equivalents to the quantities.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups are defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments, an alkenyl group has from 2 to about 30 carbon atoms, or typically, from 2 to 10 carbon atoms. Alkenyl groups may be substituted or unsubstituted. For a double bond in an alkenyl group, the configuration for the double bond can be a trans or cis configuration. Alkenyl groups may be substituted similarly to alkyl groups.

Alkynyl groups are straight chain, branched, or cyclic alkyl groups having two to about 30 carbon atoms, and further including at least one triple bond. In some embodiments, an alkynyl group has from 2 to about 30 carbon atoms, or typically, from 2 to 10 carbon atoms. Alkynyl groups may be substituted or unsubstituted. Alkynyl groups may be substituted similarly to alkyl or alkenyl groups.

As used herein, the terms "alkylene", "cycloalkylene", "alkynylides", and "alkenylene", alone or as part of another substituent, refer to a divalent radical derived from an alkyl, cycloalkyl, or alkenyl group, respectively, as exemplified by —$CH_2CH_2CH_2$—. For alkylene, cycloalkylene, alkynylene, and alkenylene groups, no orientation of the linking group is implied.

The term "ester" as used herein refers to —$R^{30}COOR^{31}$ group. $R^{30}$ is absent, a substituted or unsubstituted alkylene, cycloalkylene, alkenylene, alkynylene, arylene, aralkylene, heterocyclylalkylene, or heterocyclylene group as defined herein. $R^{31}$ is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to —$R^{32}NR^{33}R^{34}$ groups. $R^{32}$ is absent, a substituted or unsubstituted alkylene, cycloalkylene, alkenylene, alkynylene, arylene, aralkylene, heterocyclylalkylene, or heterocyclylene group as defined herein. $R^{33}$ and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of $R^{32'}NR^{33'}R^{34'}$ groups, wherein $R^{32'}$, $R^{33'}$, and $R^{34'}$ are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to —$R^{35}OH$ groups. $R^{35}$ is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to —$R^{36}COOH$ groups. $R^{36}$ is absent, a substituted or unsubstituted alkylene, cycloalkylene, alkenylene, alkynylene, arylene, aralkylene, heterocyclylalkylene, or heterocyclylene group as defined herein.

The term "ether" as used herein refers to —R$^{37}$OR$^{38}$ groups. R$^{37}$ is absent, a substituted or unsubstituted alkylene, cycloalkylene, alkenylene, alkynylene, arylene, aralkylene, heterocyclylalkylene, or heterocyclylene group as defined herein. R$^{38}$ is a substituted or unsubstituted alkyl, cycloalkyl, alkenyl, alkynyl, aryl, aralkyl, heterocyclylalkyl, or heterocyclyl group as defined herein.

The term "solvent" as used herein refers to any inorganic or organic solvent. Solvents are useful in the disclosed method or composition as reaction solvents or carrier solvents. Suitable solvents include, but are not limited to, oxygenated solvents such as lower alkanols, lower alkyl ethers, glycols, aryl glycol ethers and lower alkyl glycol ethers. Examples of other solvents include, but are not limited to, methanol, ethanol, propanol, isopropanol and butanol, isobutanol, ethylene glycol, diethylene glycol, triethylene glycol, propylene glycol, dipropylene glycol, glycol ethers, mixed ethylene-propylene glycol ethers, ethylene glycol phenyl ether, and propylene glycol phenyl ether. Water is a solvent too. The solvent used herein can be of a single solvent or a mixture of many different solvents.

Glycol ethers include, but are not limited to, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof.

As used herein, the term "substantially free", "free" or "free of" refers to compositions completely lacking the component or having such a small amount of the component that the component does not affect the performance of the composition. The component may be present as an impurity or as a contaminant and shall be less than about 0.5 wt-%. In another embodiment, the amount of the component is less than about 0.1 wt-% and in yet another embodiment, the amount of component is less than about 0.01 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present disclosure may comprise, consist essentially of, or consist of the components and ingredients of the disclosed compositions or methods as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Acids

The compositions disclosed herein may include an acid. However, in some embodiments, the compositions disclosed herein are free of an acid.

Generally, acids, as used in this disclosure, include both organic and inorganic acids. Organic acids include, but not limited to, hydroxyacetic (glycolic) acid, formic acid, acetic acid, propionic acid, butyric acid, valeric acid, caproic acid, gluconic acid, itaconic acid, trichloroacetic acid, urea hydrochloride, and benzoic acid. Organic acids also include dicarboxylic acids such as oxalic acid, malonic acid, succinic acid, glutaric acid, maleic acid, fumaric acid, adipic acid, and terephthalic acid. Combinations of these organic acids can also be used. Inorganic acids include, but are not limited to, mineral acids, such as phosphoric acid, sulfuric acid, sulfamic acid, methylsulfamic acid, hydrochloric acid, hydrobromic acid, hydrofluoric acid, and nitric acid. Inorganic acids can be used alone, in combination with other inorganic acid(s), or in combination with one or more organic acid. Acid generators can be used to form a suitable acid, including for example generators such as potassium fluoride, sodium fluoride, lithium fluoride, ammonium fluoride, ammonium bifluoride, sodium silicofluoride, etc.

Examples of particularly suitable acids in this the methods or compositions disclosed herein include inorganic and organic acids. Exemplary inorganic acids include phosphoric, phosphonic, sulfuric, sulfamic, methylsulfamic, hydrochloric, hydrobromic, hydrofluoric, and nitric. Exemplary organic acids include hydroxyacetic (glycolic), citric, lactic, formic, acetic, propionic, butyric, valeric, caproic, gluconic, itaconic, trichloroacetic, urea hydrochloride, and benzoic. Organic dicarboxylic acids can also be used such as oxalic, maleic, fumaric, adipic, and terephthalic acid.

Percarboxylic Acids and Peroxycarboxylic Acid Compositions

A peroxycarboxylic acid (i.e. peracid) or peroxycarboxylic acid composition can be included in the articles, products, or compositions disclosed herein. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peracid includes any compound of the formula R—(COOOH)$_n$, in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

A peroxycarboxylic acid composition, as used herein, refers to any composition that comprises one or more peracids, their corresponding acids, and hydrogen peroxide or or other oxidizing agents. A peroxycarboxylic acid composition can also include a stabilizer, fluorescent active tracer or compound, or other ingredients, as one skilled in the other would know.

As used herein, the terms "mixed" or "mixture" when used relating to "percarboxylic acid composition," "percarboxylic acids," "peroxycarboxylic acid composition" or "peroxycarboxylic acids" refer to a composition or mixture including more than one percarboxylic acid or peroxycarboxylic acid. Peracids such as peroxyacetic acid and peroxyoctanoic acid may also be used. Any combination of these acids may also be used.

In some embodiments, however, the articles, products, or compositions disclosed herein are free of a peroxycarboxylic acid or peroxycarboxylic acid composition.

Polyamines

A polyamine can have, but is limited to, a generic formula of $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

Small molecule polyamines include, but are not limited to ethylenediamine, diethylenetriamine, triethylenetetramine, tetraethylenepentamine, pentaethylenehexamine, hexaethyleneheptamine, and tris(2-aminoethyl)amine.

Other possible polyamines include JEFFAMINE® diamines and triamines by Huntsman. These highly versatile products contain primary amino groups attached to the end of a polyether backbone normally based on propylene oxide (PO), ethylene oxide (EO), or a mixture of both oxides. JEFFAMINE® amines include a polyetheramine family consisting of monoamines, diamines and triamines based on the core polyether backbone structure. JEFFAMINE® amines also include high-conversion, and polytetramethylene glycol (PTMEG) based polyetheramines. These JEFFAMINE® amines have an average molecular weight ($M_w$) of from about 130 to about 4,000.

A polyamine used in this disclosure can a polyamine derivative, in which one or more of the NH protons, but not all, in the polyamine is substituted by an unsubstituted or substituted group. For example, an alkyl polyamine that contains one or more alkyl group connected to the nitrogen atom can be used to produce the multiple charged cationic polyamine disclosed herein. In these PEI derivatives, only some of primary $NH_2$ or secondary NH protons are replaced by other non-proton groups and the remaining $NH_2$ or NH protons can still react with a Michael acceptor, such as an activated olefin containing a hydrophilic (ionic) group, by an aza-Michael Addition reaction.

One class of the polymeric polyamine includes polyethyleneimine (PEI) and its derivatives. Polyethyleneimine (PEI) or polyaziridine is a polymer with a repeating unit of $CH_2CH_2NH$ and has a general formulation of $NH_2(CH_2CH_2NH)_n$—$CH_2CH_2NH_2$, wherein n can be from 2 to $10^5$. The repeating monomer in PEI has a molecular weight ($M_w$) of 43.07 and a nitrogen to carbon ratio of 1:2.

PEI derivatives include ethoxylated/propylated PEIs, polyquats PEI, polyglycerol quats PEI, and other PEI derivatives, salts, or mixtures thereof. The molar mass of the polyethyleneimines, including modified polyethyleneimines can vary from about 800 g/mol to about 2,000,000 g/mol. For Example, SOKALAN® HP20 is an alkoxylated PEI product.

PEIs and their derivatives can linear, branched, or dendric. Linear polyethyleneimines contain all secondary amines, in contrast to branched PEIs which contain primary, secondary and tertiary amino groups. Totally branched, dendrimeric forms also exist and contain primary and tertiary amino groups. Drawings for unmodified linear, branched, and dendrimeric PEI are shown below.

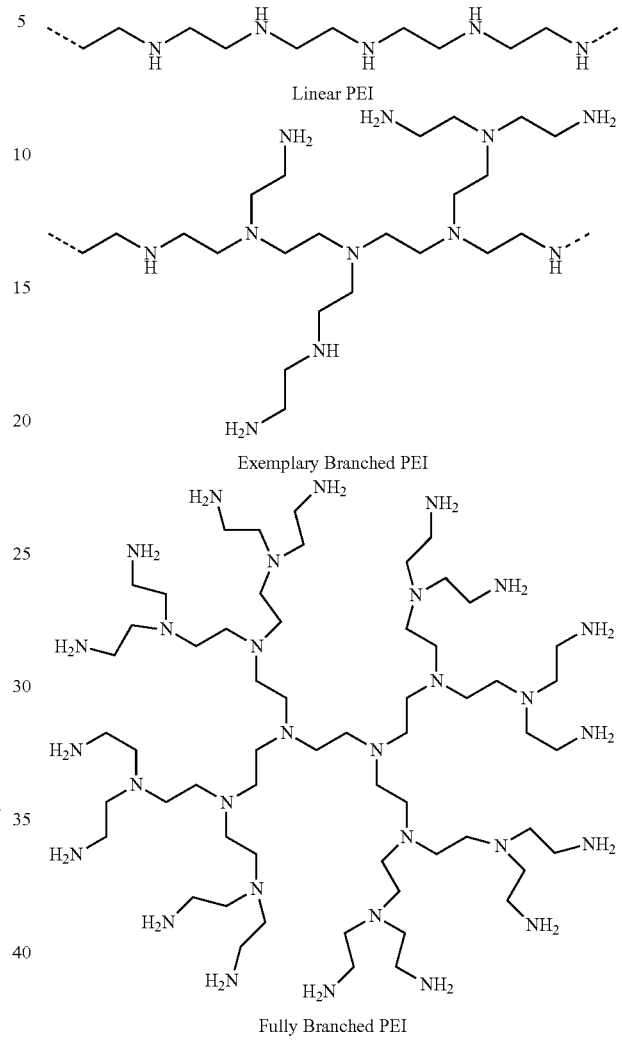

Linear PEI

Exemplary Branched PEI

Fully Branched PEI

PEI derivatives are usually obtained by substituting proton(s) on the nitrogen atoms with different group. One such PEI derivative is ethoxylated and propoxylated PEI, wherein the polyethyleneimines are derivatized with ethylene oxide (EO) and/or propylene oxide (PO) side chains. Ethoxylation of PEIs can increase the solubility of PEIs.

Usually, not every NH proton in a PEI derivative is substituted. A partially derivatized PEI can be used to produce the multiple charged cationic compounds disclosed here.

PEI is produced on industrial scale. Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK. These PEIs have average molecular weights ($M_w$) of about 800, about 1,300, about 2,000, about 5,000, about 25,000, about 1,300/2,000/5,000, about 25,000, about 750,000, about 750,000, about 1,000,000, and about 2,000,000, respectively.

Two common used averages for molecular weight of a polymer are number average molecular weight ($M_n$) and weight average molecular weight ($M_w$). The polydispersity index (D) represents the molecular weight distribution of the polymers. $Mn=(\Sigma n_i M_i)/\Sigma n_i$, $M_w=(\Sigma n_i Mi^2)/\Sigma n_i M_i$, and $D=M_w/M_n$, wherein the index number, i, represents the number of different molecular weights present in the sample and this the total number of moles with the molar mass of $M_i$. For a polymer, Mn and $M_w$ are usually different. For example, a PEI compound can have a $M_n$ of about 10,000 by GPC and $M_w$ of about 25,000 by LS.

Light Scattering (LS) can be used to measure $M_w$ of a polymer sample. Another easy way to measure molecular weight of a sample or product is gel permeation chromatography (GPC). GPC is an analytical technique that separates molecules in polymers by size and provides the molecular weight distribution of a material. GPC is also sometimes known as size exclusion chromatography (SEC). This technique is often used for the analysis of polymers for their both $M_n$ and $M_w$.

These commercial available and exemplary polyethyleneimines are soluble in water and available as anhydrous polyethyleneimines and/or modified polyethyleneimines provided in aqueous solutions or methoxypropanol (as for Lupasol® PO 100).

PEI and its derivatives find many applications usually derived from its polycationic character. Because of the presence of amine groups, PEI can be protonated with acids to form a PEI salt from the surrounding medium resulting in a product that is partially or fully ionized depending on pH. For example, about 73% of PEI is protonated at pH 2, about 50% of PEI is protonated at pH 4, about 33% of PEI is protonated at pH 5, about 25% of PEI is protonated at pH 8 and about 4% of PEI is protonated at pH 10. In general, PEIs can be purchased as their protonated or unprotonated form with and without water. The commercial PEIs at pH 13 have a charge (cationic) density of about 16-17 meq/g (milliequivalents per gram).

The counterion of each protonated nitrogen center is balanced with an anion of an acid obtained during neutralization. Examples of protonated PEI salts include, but are not limited to, PEI-hydrochloride salt, PEI-sulfuric acid salt, PEI-nitric acid salt, PEI-acetic acid salt PEI fatty acid salt and the like. In fact, any acid can be used to protonate PEIs resulting in the formation of the corresponding PEI salt compound.

Suitable polyethyleneimine useful in the present disclosure may contain a mixture of primary, secondary, and tertiary amine substituents or mixture of different average molecular weights. The mixture of primary, secondary, and tertiary amine substituents may be in any ratio, including for example in the ratio of about 1:1:1 to about 1:2:1 with branching every 3 to 3.5 nitrogen atoms along a chain segment. Alternatively, suitable polyethyleneimine compounds may be primarily one of primary, secondary or tertiary amine substituents.

The polyamine that can be used to make the multiple charged cationic compounds disclosed herein can have a wide range of its average molecular weight. Different multiple charged cationic compounds with their characteristic average molecular weights can be produced by selecting different starting small molecule polyamines, polymeric PEIs, or mixture thereof. Controlling the size of polyamines or PEI and extent of modification by the α, β-unsaturated carbonyl compound, one can produce the multiple charged cationic compounds with a similar average molecular weight and multiple cationic charges at any pH. Because of this character, one can produce and use different modified polyamines for a wider range of application that using unmodified polyamine or PEIs.

Specifically, the polyamines that can be used to make the multiple charged cationic or anionic compounds disclosed here have an average molecular weight ($M_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, 2,000,000, or any value there between.

Aza-Michael Addition Reaction Between a Polyamine and an Activated Olefin

The multiple charged cationic compounds used in the clay treatment compositions disclosed herein are derived from an aza-Michael Addition Reaction between a polyamine and an activated olefin, more specifically an α, β-unsaturated carbonyl compound containing a hydrophilic ionic group.

An aliphatic amine group may undergo an aza-Michael Addition reaction when in contact with an unsaturated hydrocarbon moiety (e.g., carbon-carbon double bond) that is in proximity of an electron withdrawing group such as carbonyl, cyano, or nitro group. Specifically, the Michael addition is a reaction between nucleophiles and activated olefin and alkyne functionalities, wherein the nucleophile adds across a carbon-carbon multiple bond that is adjacent to an electron withdrawing and resonance stabilizing activating group, such as a carbonyl group. The Michael addition nucleophile is known as the "Michael donor", the activated electrophilic olefin is known as the "Michael acceptor", and reaction product of the two components is known as the "Michael adduct." Examples of Michael donors include, but are not restricted to, amines, thiols, phosphines, carbanions, and alkoxides. Examples of Michael acceptors include, but are not restricted to, acrylate esters, alkyl methacrylates, acrylonitrile, acrylamides, maleimides, cyanoacrylates and vinyl sulfones, vinyl ketones, nitro ethylenes, α, β-unsaturated aldehydes, vinyl phosphonates, acrylonitrile, vinyl pyridines, azo compounds, beta-keto acetylenes and acetylene esters.

As used herein, an "activated olefin" refers to a substituted alkene in which at least one of the double-bond carbon has a conjugated electron withdrawing group. Examples of activated olefins include, but not limited to, α, β-unsaturated carbonyl compounds (such as $CH_2=CHCO-NH-CH_3$, alkyl-$CH=CH-CO$-alkyl, $CH_2=CH_2C(O)-O-CH_3$), $CH_2=CH-COOH$, $CH_2=CH(CH_3)-COOH$, $CH_2=CH-SO_3H$, and like.

It was found that the Aza-Michael addition can be used to synthesize the disclosed compounds without having to use a higher temperature greater than 200° C. and high pressure greater than normal atmosphere pressure and with a high yield (greater than 98%), sometimes within about 24 hours.

Aza-Michael addition reaction can be catalyzed by a strong acid or base. In some cases, some ionic liquids can function both as reaction media and catalyst. The preferred catalyst for the Aza-Michael addition reaction to synthesize the disclosed compounds is a base. Exemplary base catalyst can be hydroxide and amines. Because the reaction to synthesize the disclosed compounds uses a primary amine, the primary amine itself can function as a catalyst for the reaction. In such embodiments, no additional catalyst is necessary, or an additional catalyst is optional. Other preferred catalysts include amidine and guanidine bases.

The use of solvent and/or diluent for the reaction is optional. When employed, a wide range of non-acidic solvents are suitable, such as, for example, water, ethers (e.g., tetrahydrofuran (THF)), aromatic hydrocarbons (e.g., toluene and xylene), alcohols (e.g., n-butanol), esters (e.g., ethyl 3-ethoxypropionate), and the like. A wide range of solvents can be used for the reaction because the synthesis process is relatively insensitive to solvent. When solvent (or diluent) is employed, loading levels can range from as low as about 10 wt-% up to about 80 wt-% and higher. The solvent loading level can be about 0 wt-%, from about 1 wt-% to about 10 wt-%, from about 10 wt-% to about 20 wt-%, from about 20 wt-% to about 30 wt-%, from about 30 wt-% to about 40 wt-%, from about 40 wt-% to about 50 wt-%, from about 50 wt-% to about 60 wt-%, from about 60 wt-% to about 70 wt-%, from about 70 wt-% to about 80 wt-%, from about 1 wt-% to about 20 wt-%, from about 20 wt-% to about 40 wt-%, from about 40 wt-% to about 60 wt-%, from about 60 wt-% to about 80 wt-%, from about 40 wt-% to about 70 wt-%, about 5 wt-%, about 15 wt-%, about 25 wt-%, about 35 wt-%, about 45 wt-%, about 55 wt-%, about 65 wt-%, about 75 wt-%, or any value there between of the final reaction mixture.

Generally, the reaction can be carried out at a temperature over a wide range of temperatures. The reaction temperature can range from about 0° C. to about 150° C., more preferably from about 50° C. to about 80° C. The contacting temperature can be from about 10° C. to about 140° C., about 20° C. to about 130° C., about 30° C. to about 120° C., about 40° C. to about 110° C., about 50° C. to about 100° C., about 60° C. to about 90° C., about 70° C. to about 80° C., about 0° C. to about 20° C., about 20° C. to about 40° C., about 40° C. to about 60° C., about 60° C. to about 80° C., about 80° C. to about 100° C., about 100° C. to about 120° C., about 120° C. to about 150° C., about 5° C., about 25° C., about 45° C., about 65° C., about 85° C., about 105° C., about 125° C., about 145° C., or any value there between. The reaction temperature can be about the same from starting of the reaction to end of the reaction and can be changed from one temperature to another while the reaction is going on.

The reaction time for the synthesis of the compounds disclosed herein can vary widely, depending on such factors as the reaction temperature, the efficacy and amount of the catalyst, the presence or absence of diluent (solvent), and the like. The preferred reaction time can be from about 0.5 hours to about 48 hours, from about 1 hour to 40 hours, from about 2 hours to 38 hours, from about 4 hours to about 36 hours, from 6 hours to about 34 hours, from about 8 hours to about 32 hours, from about 10 hours to about 30 hours, from about 12 hours to about 28 hours, from about 14 hours to 26 hours, from about 16 hours to 24 hours, from about 18 hours to 20 hours, from about 1 hour to 8 hours, from 8 hours to 16 hours, from 8 hours to about 24 hours, about 2 hours, about 4 hours, about 6 hours, about 8 hours, about 10 hours, about 14 hours, about 16 hours, about 18 hours, about 24 hours, about 30 hours, about 36 hours, or any values there between.

The reaction for the synthesis of the compounds disclosed herein can go to completion when one mole of the polyamine in mole and two or more moles of the α, β-unsaturated carbonyl compound, are mixed together for a sufficient of time at a temperature described above.

The progression of the reaction can be typically monitored by ESI-MS and/or NMR spectroscopy for consumption of the monomer. The reaction products can be purified or separated by HPLC or other methods known by one skilled in the art. For reactions that proceeded to completion, the formed product was separated by removal of solvent or by precipitation in a non-polar solvent that was the opposite of the reaction media. For the reactions in water, the formed product was precipitated from the aqueous reaction mixture. Higher pressure can speed-up the reaction. Typically, if the reaction is carried out at a room temperature, the reaction can have a product yield of more than 98% in 16 hours.

Other Clay Treatment Composition Agents in a Clay Treatment Composition

In addition to the multiple charged cationic compounds derived from a polyamine as described herein, a clay treatment composition in the present disclosure includes one or more additional clay treatment composition agents.

The additional clay treatment composition agent in the disclosed clay treatment compositions can include, but is not limited to, an acid, carrier, dispersant, biocide, inorganic salt, organic salt, emulsifier, additional clay stabilizer, corrosion inhibitor, antioxidant, polymer degradation prevention agent, permeability modifier, foaming agent, antifoaming agent, fracturing proppant, glass particulate, sand, fracture proppant/sand control agent, scavenger for $H_2S$, $CO_2$, and/or $O_2$, gelling agent, lubricant, and friction reducing agent, salt, or mixture thereof.

The additional clay treatment composition agent in the disclosed clay treatment compositions can also include, but not be limited to, an organic sulfur compound, de-emulsifier, asphaltene inhibitor, paraffin inhibitor, scale inhibitor, water clarifier, emulsion breaker, reverse emulsion breaker, gas hydrate inhibitor, a pH modifier, a surfactant, or a combination thereof.

In some embodiments, the reverse emulsion breakers are organic polymers such as acrylic acid-based polymers, acrylamide-based polymers, polymerized amines, alkanolamines, thiocarbamates, and cationic polymers such as acrylamide diallyldimethylammonium chloride (DADMAC) polymer and/or methylacrylamide [3-(Methacryloylamino)propyl]trimethylammonium chloride (MAPTAC) polymers, copolymers of epichlorohydrin and dimethylamine or trimethylamine, copolymers of acrylamide and dimethylaminoethyl acrylate-methyl chloride quaternized, aluminium chlorohydrate (ACH) and polyaluminium chlorides (PAC), acrylamides—DMAEA.MCQ copolymers.

Furthermore, the additional clay treatment composition agent can be a sequestrant, solubilizer, lubricant, buffer, cleaning agent, rinse aid, preservative, binder, thickener or other viscosity modifier, processing aid, carrier, water-conditioning agent, foam inhibitor or foam generator, threshold agent or system, aesthetic enhancing agent (e.g., dye, odorant, perfume), other additive suitable for formulation with a clay stabilizer, or mixtures thereof.

The additional clay treatment composition agent in a clay treatment composition will vary according to the specific clay treatment composition being manufactured and its intend use as one skilled in the art will appreciate.

Alternatively, the clay treatment composition does not contain or is free of one or more of the additional clay treatment composition agents.

When one or more additional clay treatment composition agents are used for clay treatment, they can be formulated together with the multiple charged cationic compounds derived from a polyamine as described here in the same clay treatment composition and be supplied to the stimulation fluid. Alternatively, some or all the additional clay treatment composition agent can be formulated into one or more different formulations and be supplied to the stimulation fluid. In other words, the additional clay treatment composition agents can be provided into a subterranean formation independently, simultaneously, or sequentially.

Biocide and Carrier

In some embodiments, the clay treatment compositions disclosed herein further include a biocide. In some other embodiments, the disclosed clay treatment compositions herein further include a carrier. In some other embodiments, the disclosed clay treatment compositions herein further include a biocide and carrier. In some embodiments, the disclosed methods or clay treatment compositions herein may consist of one or more multiple charged cationic compounds disclosed herein and carrier. In some embodiments, the clay treatment compositions disclosed herein consist of one or more multiple charged cationic compounds disclosed herein, a carrier, and a biocide.

Biocides suitable for use may be oxidizing or non-oxidizing biocides. Oxidizing biocides can include, but are not limited to, bleach, chlorine, bromine, chlorine dioxide, peroxycarboxylic acid, peroxycarboxylic acid composition, and materials capable of releasing chlorine, bromine, or peroxide. Non-oxidizing biocides include, but are not limited to, glutaraldehyde, isothiazolin, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene(dimethyliminio)ethylene(dimethyliminio)ethylene dichloride, methylene bisthiocyanate, 2-decylthioethanamine, tetrakis-hydroxymethyl phosphonium sulfate, dithiocarbamate, cyanodithioimidocarbonate, 2-methyl-5-nitroimidazole-1-ethanol, 2-(2-bromo-2-nitroethenyl)furan, beta-bromo-beta-nitrostyrene, beta-nitrostyrene, beta-nitrovinyl furan, 2-bromo-2-bromomethyl glutaronitrile, bis(trichloromethyl) sulfone, S-(2-hydroxypropyl)thiomethanesulfonate, tetrahydro-3,5-dimethyl-2H-1,3,5-hydrazine-2-thione, 2-(thiocyanomethylthio)benzothiazole, 2-bromo-4'-hydroxyacetophenone, 1,4-bis(bromoacetoxy)-2-butene, bis(tributyltin) oxide, 2-(tert-butylamino)-4-chloro-6-(ethylamino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo[2.2.1]heptane-2,3-dicarboxylic acid, 4,5-dichloro-2-n-octyl-4-isothiazoline-3-one, 5-chloro-2-methyl-4-isothiazolin-3-one and 2-methyl-4-isothiazolin-3-one.

Suitable non-oxidizing biocides also include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxycarboxylic acid, peroxycarboxylic acid composition, and peroxides.

The composition can comprise from about 0.1 wt-% to about 10 wt-%, from about 0.5 wt-% to about 5 wt-%, or from about 0.5 wt-% to about 4 wt-% of a biocide, based on total weight of the composition.

A carrier in the disclosed clay treatment composition can be water, an organic solvent, or a combination of water and an organic solvent. The organic solvent can be an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The composition can comprise from about 1 wt-% to about 80 wt-%, from about 5 wt-% to about 50 wt-%, from about 5 wt-% to about 45 wt-%, from about 5 wt-% to about 30 wt-%, from about 5 wt-% to about 25 wt-%, from about 5 wt-% to about 20 wt-%, from about 5 wt-% to about 15 wt-%, from about 5 wt-% to about 10 wt-%, from about 10 wt-% to about 35 wt-%, from about 10 wt-% to about 25 wt-%, or from about 10 wt-% to about 35 wt-% of the one or more carriers, based on total weight of the composition.

Corrosion Inhibitor

In some embodiments, the clay treatment compositions disclosed herein further include a corrosion inhibitor. In some other embodiments, the disclosed clay treatment compositions herein further include a corrosion inhibitor and carrier. In some other embodiments, the disclosed clay treatment compositions herein further include a corrosion inhibitor, biocide, and carrier. In some embodiments, the disclosed clay treatment compositions herein may consist of one or more multiple charged cationic compounds disclosed herein, one or more corrosion inhibitors and carrier. In some embodiments, the clay treatment compositions disclosed herein consist of one or more multiple charged cationic compounds disclosed herein, a carrier, corrosion inhibitor, and a biocide.

The clay treatment composition can comprise from about 0.1 wt-% to about 20 wt-%, from about 0.1 wt-% to about 10 wt-%, or from 0.1 to about 5 wt-% of the one or more corrosion inhibitors, based on total weight of the composition. A composition of the disclosure can comprise from about 0 wt-% to about 10 wt-% of the one or more corrosion inhibitors, based on total weight of the composition. The composition can comprise about 1.0 wt-%, about 1.5 wt-%, about 2.0 wt-%, about 2.5 wt-%, about 3.0 wt-%, about 3.5 wt-%, about 4.0 wt-%, about 4.5 wt-%, about 5.0 wt-%, about 5.5 wt-%, about 6.0 wt-%, about 6.5 wt-%, about 7.0 wt-%, about 7.5 wt-%, about 8.0 wt-%, about 8.5 wt-%, about 9.0 wt-%, about 9.5 wt-%, about 10.0 wt-%, about 10.5 wt-%, about 11.0 wt-%, about 11.5 wt-%, about 12.0 wt-%, about 12.5 wt-%, about 13.0 wt-%, about 13.5 wt-%, about 14.0 wt-%, about 14.5 wt-%, or about 15.0 wt-% of the one or more corrosion inhibitors, based on total weight of the composition. Each subterranean formation can have its own requirements for using a corrosion inhibitor, and the weight percent of one or more corrosion inhibitors in the composition can vary with the subterranean formation in which it is used.

A corrosion inhibitor is needed to reduce corrosion of metals in equipment used to supplying the clay treatment compositions into the stimulation fluid or into the subterranean formations. Corrosion inhibitors for multi-metal protection are typically triazoles, such as, but not limited to, benzotriazole, halogenated triazoles, and nitro-substituted azoles.

The one or more corrosion inhibitors can be an imidazoline compound, a quaternary ammonium compound, a pyridinium compound, or a combination thereof.

The one or more corrosion inhibitor component can be an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (1A) or an imidazoline derivative. Representative imidazoline derivatives include an imidazolinium compound of Formula (2A) or a bis-quaternized compound of Formula (3A).

The one or more corrosion inhibitor component can include an imidazoline of Formula (1A):

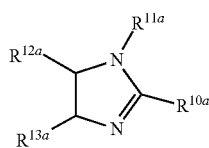
(1A)

wherein $R^{10a}$ is a $C_1$-$C_{20}$ alkyl or a $C_1$-$C_{20}$ alkoxyalkyl group; $R^{11a}$ is hydrogen, $C_1$-$C_6$ alkyl, $C_1$-$C_6$ hydroxyalkyl, or $C_1$-$C_6$ arylalkyl; and $R^{12a}$ and $R^{13a}$ are independently hydrogen or a $C_1$-$C_6$ alkyl group. Preferably, the imidazoline includes an $R^{10a}$ which is the alkyl mixture typical in tall oil fatty acid (TOFA), and $R^{11a}$, $R^{12a}$ and $R^{13a}$ are each hydrogen.

The one or more additional corrosion inhibitor component can be an imidazolinium compound of Formula (2A):

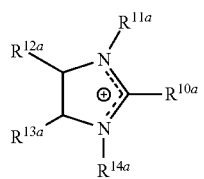
(2A)

wherein $R^{10a}$ is a $C_1$-$C_{20}$ alkyl or a $C_1$-$C_{20}$ alkoxyalkyl group; $R^{11a}$ and $R^{14a}$ are independently hydrogen, $C_1$-$C_6$ alkyl, $C_1$-$C_6$ hydroxyalkyl, or $C_1$-$C_6$ arylalkyl; $R^{12a}$ and $R^{13a}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The one or more additional corrosion inhibitors can be a bis-quaternized compound having the formula (3A):

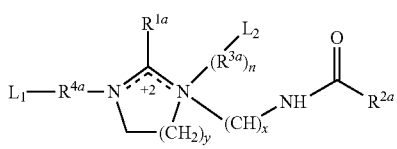
(3A)

wherein $R^{1a}$ and $R^{2a}$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R^{3a}$ and $R^{4a}$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H, —COOR$^{5a}$, —CONH$_2$, —CONHR$^{5a}$, or —CON(R$^{5a}$)$_2$; $R^{5a}$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R^{1a}$ and $R^{2a}$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R^{1a}$ and $R^{4a}$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H; and $L_2$ is absent, H, —COOH, —SO$_3$H, or —PO$_3$H. For example, $R^{1a}$ and $R^{2a}$ can be derived from a mixture of tall oil fatty acids and are predominantly a mixture of $C_{17}H_{33}$ and $C_{17}H_{31}$ or can be $C_{16}$-$C_{18}$ alkyl; $R^{1a}$ and $R^{4a}$ can be $C_2$-$C_3$ alkylene such as —C$_2$H$_2$—; n is 1 and $L_2$ is —COOH or n is 0 and $L_2$ is absent or H; x is 2; y is 1; $R^{1a}$ and $R^{4a}$ are —C$_2$H$_2$—; and $L_1$ is —COOH.

It should be appreciated that the number of carbon atoms specified for each group of formula (3A) refers to the main chain of carbon atoms and does not include carbon atoms that may be contributed by substituents.

The one or more corrosion inhibitors can be a bis-quaternized imidazoline compound having the formula (3A) wherein $R^{1a}$ and $R^{2a}$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R^{4a}$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —SO$_3$H, or —PO$_3$H; and $L_2$ is absent or H. Preferably, a bis-quaternized compound has the formula (3A) wherein $R^{1a}$ and $R^{2a}$ are each independently $C_{16}$-$C_{18}$ alkyl; $R^{4a}$ is —C$_2$H$_2$—; x is 2; y is 1; n is 0; $L_1$ is —COOH, —SO$_3$H, or —PO$_3$H and $L_2$ is absent or H.

The one or more corrosion inhibitors can be a quaternary ammonium compound of Formula (4A):

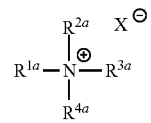
(4A)

wherein $R^{1a}$, $R^{2a}$, and $R^{3a}$ are independently $C_1$ to $C_{20}$ alkyl, $R^{4a}$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N$^+$R$^{5a}$R$^{6a}$R$^{7a}$R$^{8a}$][X$^-$] wherein R$^{5a}$, R$^{7a}$, and R$^{8a}$ contain one to 18 carbon atoms, and X is Cl, Br or I. For the quaternary salts, R$^{5a}$, R$^{6a}$, R$^{7a}$, and R$^{8a}$ can each be independently alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [N+R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The one or more corrosion inhibitor component can be a pyridinium salt such as those represented by Formula (5A):

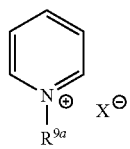

(5A)

wherein R$^{9a}$ is an alkyl group, an aryl group, or an arylalkyl group, wherein said alkyl groups have from 1 to about 18 carbon atoms and X$^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a C$_1$-C$_6$ hydrocarbyl group. Preferably, the pyridinium compound includes benzyl pyridinium chloride.

The one or more additional corrosion inhibitors can be a phosphate ester, monomeric or polymeric fatty acid, alkoxylated amine, or mixture thereof.

The one or more corrosion inhibitor component can be a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di-and trialkyl phosphate esters, alkylaryl or arylalkyl phosphate esters are those prepared by reacting a C$_3$-C$_{18}$ aliphatic alcohol with phosphorous pentoxide. The phosphate intermediate interchanges its ester groups with triethylphosphate producing a broader distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include C$_6$ to C$_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred. The one or more corrosion inhibitors can be a monomeric or polymeric fatty acid.

Preferred monomeric fatty acids are C$_{14}$-C$_{22}$ saturated and unsaturated fatty acids as well as polymeric products obtained by polymerizing one or more of such fatty acids.

The one or more corrosion inhibitors can be an alkoxylated amine. The alkoxylated amine can be an ethoxylated alkyl amine. The alkoxylated amine can be ethoxylated tallow amine.

Dispersant

In some embodiments, the clay treatment compositions disclosed herein can further comprise a dispersant. A dispersant keeps particulate matter present in the water of a subterranean formation or stimulation fluid dispersed, so that it does not agglomerate. The composition can comprise from about 0.1 wt-% to about 10 wt-%, from about 0.5 wt-% to about 5 wt-%, or from about 0.5 wt-% to about 4 wt-% of a dispersant, based on total weight of the composition.

A dispersant may be an acrylic acid polymer, maleic acid polymer, copolymer of acrylic acid with sulfonated monomers, alkyl esters thereof, or combination thereof. These polymers may include terpolymers of acrylic acid, acrylamide and sulfonated monomers. These polymers may also include quad-polymers consisting of acrylic acid and three other monomers.

Suitable dispersants include, but are not limited to, aliphatic phosphonic acids with 2-50 carbons, such as hydroxyethyl diphosphonic acid, and aminoalkyl phosphonic acids, e.g., polyaminomethylene phosphonates with 2-10 N atoms e.g., each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The clay treatment composition can further comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. Such compounds are used as synergists in the composition. The organic sulfur compound can constitute from about 0.5 wt-% to about 15 wt-% of the composition, based on total weight of the composition, preferably from about 1 wt-% to about 10 wt-% and more preferably from about 1 wt-% to about 5 wt-%. The organic sulfur compound can constitute about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 11 wt-%, about 12 wt-%, about 13 wt-%, about 14 wt-%, or about 15 wt-% of the composition.

The clay treatment composition can further comprise a de-emulsifier. Preferably, the de-emulsifier comprises an oxyalkylate polymer, such as a polyalkylene glycol. The de-emulsifier can constitute from about 0.1 wt-% to about 10 wt-%, from about 0.5 wt-% to about 5 wt. %, or from about 0.5 wt-% to about 4 wt-% of the composition, based on total weight of the composition. The de-emulsifier can constitute about 0.5 wt-%, about 1 wt-%, about 1.5 wt-%, about 2 wt-%, about 2.5 wt-%, about 3 wt-%, about 3.5 wt-%, about 4 wt-%, about 4.5 wt-% or about 5 wt-% of the composition.

The clay treatment composition can further comprise an asphaltene inhibitor. The composition can comprise from about 0.1 wt-% to about 10 wt-%, from about 0.1 wt-% to about 5 wt-%, or from about 0.5 wt-% to about 4 wt-% of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The clay treatment composition can further comprise a paraffin inhibitor. The composition can comprise from about 0.1 wt-% to about 10 wt-%, from about 0.1 wt-% to about 5 wt-%, or from about 0.5 wt-% to about 4 wt-% of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The clay treatment composition can further comprise a scale inhibitor. The composition can comprise from about 0.1 wt-% to about 20 wt-%, from about 0.5 wt-% to about 10 wt-%, or from about 1 wt-% to about 10 wt-% of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), mono-, bis- and oligomeric phosphinosuccinic acid (PSO) derivatives, polycarboxylic acid, hydrophobically modified polycarboxylic acid, and salts of a polymaleic acid/acrylic acid/acrylamidomethyl propane sulfonate terpolymer (PMA/AA/AMPS).

The clay treatment composition can further comprise an emulsifier. The composition can comprise from about 0.1 wt-% to about 10 wt-%, from about 0.5 wt-% to about 5 wt-%, or from about 0.5 wt-% to about 4 wt-% of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

The clay treatment composition can further comprise a water clarifier. The composition can comprise from about 0.1 to 10 wt-%, from about 0.5 to 5 wt-%, or from about 0.5 to 4 wt-% of a water clarifier, based on total weight of the composition. Suitable water clarifiers include, but are not limited to, inorganic metal salts such as alum, aluminum chloride, and aluminum chlorohydrate, or organic polymers such as acrylic acid-based polymers, acrylamide-based polymers, polymerized amines, alkanolamines, thiocarbamates, and cationic polymers such as diallyldimethylammonium chloride (DADMAC).

The clay treatment composition can further comprise an emulsion breaker. The composition can comprise from about 0.1 wt-% to about 10 wt-%, from about 0.5 wt-% to about 5 wt-%, or from about 0.5 wt-% to about 4 wt-% of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The clay treatment composition can further comprise a hydrogen sulfide scavenger. The composition can comprise from about 1 wt-% to about 50 wt-%, from about 1 wt-% to about 40 wt-%, or from about 1 wt-% to about 30 wt-% of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The clay treatment composition can further comprise a gas hydrate inhibitor. The composition can comprise from about 0.1 wt-% to about 25 wt-%, from about 0.5 wt-% to about 20 wt-%, or from about 1 wt-% to about 10 wt-% of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The clay treatment composition can further comprise a kinetic hydrate inhibitor. The composition can comprise from about 0.1 wt-% to about 25 wt-%, from about 0.5 wt-% to about 20 wt-%, or from about 1 wt-% to about 10 wt-% of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The clay treatment composition can further comprise a pH modifier. The composition can comprise from about 0.1 wt-% to about 20 wt-%, from about 0.5 wt-% to about 10 wt-%, or from about 0.5 wt-% to about 5 wt-% of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The clay treatment composition can further comprise a surfactant. The composition can comprise from about 0.1 wt-% to about 10 wt-%, from about 0.5 wt-% to about 5 wt-%, or from about 0.5 wt-% to about 4 wt-% of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

The clay treatment composition can further comprise a friction reducer, cross linker, flowback aid, viscosifier, and the like.

Additionally, the clay treatment composition can be formulated into compositions comprising the following components shown in Table 1. These formulations include the ranges of the components listed and can optionally include additional agents. The values in Tables 1A-1E below are weight percentages.

TABLE 1

| A. Exemplary Clay Treatment Compositions | | | | | | | | |
|---|---|---|---|---|---|---|---|---|
| | Composition ID | | | | | | | |
| | 1 | 2 | 3 | 4 | 5 | 6 | 7 | 8 |
| Multiple Charged Cationic Compound(s) | 0.025-0.2 | 0.025-0.2 | 0.025-0.2 | 0.025-0.2 | 0.025-0.2 | 0.025-0.2 | 0.025-0.2 | 0.025-0.2 |
| Friction reducer | 0.025-0.4 | 0 | 0.025-0.4 | 0.025-0.4 | 0.025-0.4 | 0.025-0.4 | 0 | 0 |
| Flowback aid | 0.025-0.2 | 0.025-0.2 | 0 | 0.025-0.2 | 0.025-0.2 | 0.025-0.2 | 0 | 0.025-0.2 |
| Viscosifier | 0.025-1.0 | 0.025-1.0 | 0.025-1.0 | 0.025-1.0 | 0.025-1.0 | 0.025-1.0 | 0.025-1.0 | 0.025-1.0 |
| Crosslinker | 0.010-0.3 | 0.010-0.3 | 0.010-0.3 | 0 | 0.010-0.3 | 0.010-0.3 | 0.010-0.3 | 0 |
| Scale inhibitor | 0.025-0.2 | 0.025-0.2 | 0.025-0.2 | 0.025-0.2 | 0 | 0.025-0.2 | 0.025-0.2 | 0.025-0.2 |
| Biocide | 0.025-0.2 | 0.025-0.2 | 0.025-0.2 | 0.025-0.2 | 0.025-0.2 | 0 | 0.025-0.2 | 0.025-0.2 |
| Water | 97.5-99.84 | 97.9-99.865 | 97.7-99.865 | 97.8-99.85 | 97.7-99.865 | 97.7-99.865 | 98.1-99.89 | 98.2-99.875 |

| B. Exemplary Clay Treatment Compositions | | | | | | | | | |
|---|---|---|---|---|---|---|---|---|---|
| | Composition ID | | | | | | | | |
| | 8 | 9 | 10 | 11 | 12 | 13 | 14 | 15 | 16 |
| Multiple Charged Cationic Compound(s) | 0.025-0.2 | 0.025-0.2 | 0.025-0.2 | 0.025-0.2 | 0.025-0.2 | 0.025-0.2 | 0.025-0.2 | 0.025-0.2 | 0.025-0.2 |
| Friction reducing agent | 0 | 0 | 0.025-0.4 | 0.025-0.4 | 0.025-0.4 | 0.025-0.4 | 0.025-0.4 | 0.025-0.4 | 0.025-0.4 |
| Flowback aid | 0.025-0.2 | 0.025-0.2 | 0 | 0 | 0 | 0.025-0.2 | 0.025-0.2 | 0.025-0.2 | 0.025-0.2 |
| Viscosifier | 0.025-1.0 | 0.025-1.0 | 0.025-1.0 | 0.025-1.0 | 0.025-1.0 | 0 | 0.025-1.0 | 0.025-1.0 | 0.025-1.0 |
| Crosslinker | 0.010-0.3 | 0.010-0.3 | 0 | 0.010-0.3 | 0.010-0.3 | 0 | 0 | 0 | 0.010-0.3 |
| Scale inhibitor | 0 | 0.025-0.2 | 0.025-0.2 | 0 | 0.025-0.2 | 0.025-0.2 | 0 | 0.025-0.2 | 0 |
| Biocide | 0.025-0.2 | 0 | 0.025-0.2 | 0.025-0.2 | 0 | 0.025-0.2 | 0.025-0.2 | 0 | 0 |
| Water | 98.1-99.89 | 98.1-99.89 | 98-99.875 | 97.9-99.89 | 97.9-99.89 | 98.8-99.875 | 98-99.875 | 98-99.875 | 97.9-99.89 |

TABLE 1-continued

C. Exemplary Clay Treatment Compositions

| | Composition ID | | | | | | | |
|---|---|---|---|---|---|---|---|---|
| | 17 | 18 | 19 | 20 | 21 | 22 | 23 | 24 |
| Multiple Charged Cationic Compound(s) | 0.025-0.2 | 0.025-0.2 | 0.025-0.2 | 0.025-0.2 | 0.025-0.2 | 0.025-0.2 | 0.025-0.2 | 0.025-0.2 |
| Friction reducer | 0 | 0 | 0 | 0.025-0.4 | 0.025-0.4 | 0.025-0.4 | 0.025-0.4 | 0.025-0.4 |
| Flowback aid | 0 | 0 | 0 | 0 | 0 | 0 | 0 | 0.025-0.2 |
| Viscosifier | 0.025-1.0 | 0.025-1.0 | 0.025-1.0 | 0 | 0.025-1.0 | 0.025-1.0 | 0.025-1.0 | 0 |
| Crosslinker | 0 | 0.010-0.3 | 0.010-0.3 | 0 | 0 | 0 | 0.010-0.3 | 0 |
| Scale inhibitor | 0.025-0.2 | 0 | 0.025-0.2 | 0.025-0.2 | 0 | 0.025-0.2 | 0 | 0 |
| Biocide | 0.025-0.2 | 0.025-0.2 | 0 | 0.025-0.2 | 0.025-0.2 | 0 | 0 | 0.025-0.2 |
| Water | 98.4-99.9 | 98.3-99.915 | 98.3-99.915 | 99-99.9 | 98.2-99.9 | 98.2-99.9 | 98.1-99.915 | 99-99.9 |

D. Exemplary Clay Treatment Compositions

| | Composition ID | | | | | | | |
|---|---|---|---|---|---|---|---|---|
| | 25 | 26 | 27 | 28 | 29 | 30 | 31 | 32 |
| Multiple Charged Cationic Compound(s) | 0.025-0.2 | 0.025-0.2 | 0.025-0.2 | 0.025-0.2 | 0.025-0.2 | 0.025-0.2 | 0.025-0.2 | 0.025-0.2 |
| Friction reducer | 0.025-0.4 | 0.025-0.4 | 0 | 0 | 0 | 0.025-0.4 | 0.025-0.4 | 0.025-0.4 |
| Flowback aid | 0.025-0.2 | 0.025-0.2 | 0 | 0 | 0 | 0 | 0 | 0 |
| Viscosifier | 0 | 0.025-1.0 | 0.025-1.0 | 0.025-1.0 | 0.025-1.0 | 0 | 0 | 0.025-1.0 |
| Crosslinker | 0 | 0 | 0 | 0 | 0.010-0.3 | 0 | 0 | 0 |
| Scale inhibitor | 0.025-0.2 | 0 | 0 | 0.025-0.2 | 0 | 0 | 0.025-0.2 | 0 |
| Biocide | 0 | 0 | 0.025-0.2 | 0 | 0 | 0.025-0.2 | 0 | 0 |
| Water | 99-99.9 | 98.2-99.9 | 98.6-99.925 | 98.6-99.925 | 98.5-99.94 | 99.2-99.925 | 99.2-99.925 | 98.4-99.925 |

E. Exemplary Clay Treatment Compositions

| | Composition ID | | |
|---|---|---|---|
| | 33 | 34 | 35 |
| Multiple Charged Cationic Compound(s) | 0.025-0.2 | 0.025-0.2 | 0.025-0.2 |
| Friction reducer | 0.025-0.4 | 0.025-0.4 | 0 |
| Flowback aid | 0.025-0.2 | 0 | 0 |
| Viscosifier | 0 | 0 | 0.025-1.0 |
| Crosslinker | 0 | 0 | 0 |
| Scale inhibitor | 0 | 0 | 0 |
| Biocide | 0 | 0 | 0 |
| Water | 99.2-99.925 | 99.4-99.95 | 98.8-99.95 |

In some embodiments, the clay treatment composition or the multiple charged cationic compounds may be added to a fluid or stimulation fluid for oil and gas operations, so the concentration of the composition or the compound in the fluid or stimulation fluid is from about 1 ppm to about 2,000 ppm or from about 400 ppm to about 7,000 ppm. In other embodiments, the amount of the clay treatment composition or the multiple charged cationic compounds in the fluid may range from about 5 ppm to about 2,000 ppm, from about 50 ppm to about 2,000 ppm, from about 100 ppm to about 2,000 ppm, from about 200 ppm to about 2,000 ppm, from about 250 ppm to about 2,000 ppm, from about 300 ppm to about 2,000 ppm, from about 400 ppm to about 2,000 ppm, from about 100 ppm to about 1,000 ppm, from about 200 ppm to about 800 ppm, from about 300 ppm to about 700 ppm, from about 400 ppm to about 600 ppm, or from about 100 ppm to about 500 ppm. In some embodiments, the clay treatment composition or the multiple charged cationic compounds may be added to the water of the subterranean formation to an amount ranging from about 50 ppm to about 2,000 ppm, from about 100 ppm to about 500 ppm, from about 250 ppm to about 2,000 ppm, or from about 200 ppm to about 800 ppm.

The clay treatment composition or the multiple charged cationic compounds can be applied to any fluid or stimulation fluid used in crude oil or natural gas productions.

A fluid to which the clay treatment composition or the multiple charged cationic compounds can be introduced can be an aqueous medium. The aqueous medium can comprise water, oil, and optionally liquid hydrocarbon.

A fluid or gas treated with the clay treatment composition or the multiple charged cationic compounds can be at any selected temperature, such as ambient temperature or an elevated temperature. The fluid (e.g., liquid hydrocarbon) or gas can be at a temperature of from about 40° C. to about 250° C. The fluid or gas can be at a temperature of from about −50° C. to about 300° C., from about 0° C. to about 200° C., from about 10° C. to about 100° C., or from about 20° C. to about 90° C. The fluid or gas can be at a temperature of about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., or about 40° C. The fluid or gas can be at a temperature of about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., or about 100° C.

The clay treatment composition or the multiple charged cationic compounds can be added to a fluid or stimulation fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The clay treatment composition or the multiple charged cationic compounds can be introduced into a fluid, stimulation fluid, or gas by any appropriate method for ensuring dispersal through the fluid or gas. For examples, the clay treatment composition or the multiple charged cationic compounds can be added to a drilling fluid or stimulation fluid before the drilling or stimulation fluid contacts the subterranean formation.

The clay treatment composition or the multiple charged cationic compounds can be added at a point in a flow line upstream from the point at which the fluid is used for oil and gas productions. The clay treatment composition or the multiple charged cationic compounds can be injected using mechanical equipment such as chemical injection pumps, piping tees, injection fittings, atomizers, quills, and the like.

The clay treatment composition or the multiple charged cationic compounds can be pumped into an oil and/or gas pipeline using an umbilical line. A capillary injection system can be used to deliver the clay treatment composition or the multiple charged cationic compounds to a selected fluid.

A fluid to which the clay treatment composition or the multiple charged cationic compounds can be introduced can be an aqueous medium. The aqueous medium can comprise water, oil, and optionally liquid hydrocarbon. A fluid to the clay treatment composition or the multiple charged cationic compounds can be introduced can be fracturing fluid, acidizing fluid, drilling fluid, drill-in fluid, stimulation fluid, gravel pack fluid, completion fluid, cementing fluid, other oil gas operation fluid, any other fluid for oil and gas production, or mixture thereof.

The clay treatment composition or the multiple charged cationic compounds can be introduced into a liquid and a mixture of several liquids, a liquid and gas, liquid, solid, and gas. The clay treatment composition or the multiple charged cationic compounds can be injected into a gas stream as an aqueous or non-aqueous solution, mixture, or slurry.

The fluid or gas can be passed through an absorption tower comprising the clay treatment composition or the multiple charged cationic compounds.

The clay treatment composition or the multiple charged cationic compounds can be applied to a fluid or gas to provide any selected concentration. In practice, the clay treatment composition or the multiple charged cationic compounds are typically added to a flow line to provide an effective treating dose of the clay treatment composition or the multiple charged cationic compounds from about 0.01 ppm to about 5,000 ppm. The clay treatment composition or the multiple charged cationic compounds can be applied to a fluid or gas to provide an active concentration of about 1 parts per million (ppm) to about 1,000,000 ppm, from about 1 parts per million (ppm) to about 100,000 ppm, or from about 10 ppm to about 75,000 ppm. The polymer salts/compositions can be applied to a fluid to provide an actives concentration of from about 100 ppm to about 10,000 ppm, from about 200 ppm to about 8,000 ppm, or from about 500 ppm to about 6,000 ppm. The actives concentration means the concentration of clay treatment composition or the multiple charged cationic compounds.

The clay treatment composition or the multiple charged cationic compounds can be applied to a fluid or gas to provide an active concentration of about 0.1 ppm, about 0.5 ppm, about 1 ppm, about 2 ppm, about 5 ppm, about 10 ppm, about 20 ppm, about 100 ppm, about 200 ppm, about 500 ppm, or about 1,000 ppm. The multiple charged cationic compounds, their salt or clay treatment composition can be applied to a fluid or gas to provide an actives concentration of about 0.125 ppm, about 0.25 ppm, about 0.625 ppm, about 1 ppm, about 1.25 ppm, about 2.5 ppm, about 5 ppm, about 10 ppm, about 20 ppm, about 40 ppm, about 60 ppm, about 100 ppm, about 200 ppm, about 400 ppm, about 600 ppm, about 800 ppm, about 1,000 ppm in the fluid or gas. Each fluid can have its own dose level requirements, and the effective dose level of the clay treatment composition or the multiple charged cationic compounds to sufficiently prevent clay swell, clay migration, or sludge formation can vary with the subterranean system in which it is used.

The clay treatment composition or the multiple charged cationic compounds can be applied continuously, in batch, or a combination thereof. The clay treatment composition or the multiple charged cationic compounds dosing can be continuous. The clay treatment composition or the multiple charged cationic compounds dosing can be intermittent (e.g., batch treatment) or can be continuous/maintained and/or intermittent.

Dosage rates for continuous treatments typically range from about 10 ppm to about 500 ppm, or from about 10 ppm to about 200 ppm. Dosage rates for batch treatments typically range from about 10 ppm to about 400,000 ppm, or from about 10 to about 20,000 ppm. The clay treatment composition or the multiple charged cationic compounds can be applied as a pill to a pipeline, providing a high dose (e.g., 20,000 ppm) of the composition.

The flow rate of a flow line in which the clay treatment composition or the multiple charged cationic compounds is used can be between about 0.1 feet per second and about 100 feet per second, or between about 0.1 feet per second and about 50 feet per second. The clay treatment composition or the multiple charged cationic compounds can also be formulated with water to facilitate addition to the flow line.

The clay treatment composition or the multiple charged cationic compounds can be dispensed in any suitable method generally known by one skilled in the art. For example, a spray-type dispenser can be used. A spray-type dispenser functions by impinging a water spray upon an exposed surface of a composition to dissolve a portion of the composition, and then immediately directing the concentrate solution including the composition out of the dispenser to a storage reservoir or directly to a point of use.

The clay treatment composition or the multiple charged cationic compounds can be dispensed by immersing either intermittently or continuously in a fluid used in oil and gas productions. The clay treatment composition or the multiple charged cationic compounds can then dissolve, for example, at a controlled or predetermined rate. The rate can be effective to maintain a concentration of the dissolved compounds or compositions that are effective for use according to the methods disclosed herein.

The clay treatment composition disclosed herein can comprise from about 10 wt-% to about 90 wt-% of the additional clay treatment composition agent(s) and from about 10 wt-% to about 90 wt-% of one or more multiple charged cationic compounds. The clay treatment composition disclosed herein can comprise from about 20 wt-% to about 80 wt-% of the carrier, biocide, corrosion inhibitor, additional clay treatment composition agent, a combination thereof; from about 20 wt-% to about 80 wt-% of one or more multiple charged cationic compounds, from about 30 wt-% to about 70 wt-% of the carrier, biocide, corrosion inhibitor, additional clay treatment composition agent, a combination thereof and from about 30 wt-% to about 70 wt-% of one or more multiple charged cationic compounds, from about 40 wt-% to about 60 wt-% of the carrier, biocide, corrosion inhibitor, additional clay treatment composition agent, a combination thereof and from about 40 wt-% to about 60 wt. % water; or from about 40 wt-% to about 60 wt-% of one or more multiple charged cationic compounds, from about 10 wt-% to about 20 wt-% of the biocide, corrosion inhibitor, additional clay treatment composition agent, a combination thereof and from about 20 wt-% to about 60 wt. % water.

The clay treatment composition can comprise an oxyalkylated phenol-formaldehyde resin, a resin ester, an oxyalkylated polyalkylamine, a polyol, a cross-linked polyol with a di- or multi-functional cross linker, an isocyanate, an acid, or a combination thereof.

The clay treatment composition can comprise one or more additional clay stabilizers depending on the properties of the subterranean formation.

In some instances, the multiple charged cationic compound and the additional clay treatment composition agent have a synergistic effect for preventing clay swell, clay migration, and sludge formation in a specific subterranean formation.

In one aspect, disclosed herein is a clay treatment composition for stabilizing swellable clays and/or reducing formation of sludge in a subterranean formation, wherein the clay treatment composition comprises a compound or its salt derived from an aza-Michael Addition Reaction between a polyamine and an α, β-unsaturated carbonyl compound according to the following formula

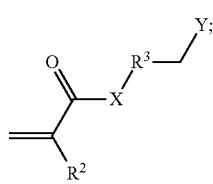

and
one or more additional clay treatment composition agents, wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear $C_1$-$C_{30}$ alkylene group; Y is —$NR_4R_5R_6^{(+)}$, or a salt thereof; and $R^4$, $R^5$, and $R^6$ are independently a $C_1$-$C_{10}$ alkyl group; wherein the compound is a multiple charged cationic compound having 2, 3, or more positive charges. In some embodiments, a use solution of the clay treatment composition reduces clay swelling, clay migration, and sludge formation in the subterranean formation.

In another aspect, disclosed herein is a method of stabilizing swellable clays and/or reducing formation of sludge in a subterranean formation, wherein the method comprises providing a clay treatment composition into a subterranean formation, wherein the clay treatment composition comprises one or more additional clay treatment composition agents and a compound or its salt derived from an aza-Michael Addition Reaction between a polyamine and an α, β-unsaturated carbonyl compound according to the following formula

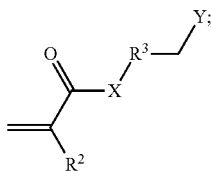

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear $C_1$-$C_{30}$ alkylene group; Y is —$NR_4R_5R_6^{(+)}$, or a salt thereof; and $R^4$, $R^5$, and $R^6$ are independently a $C_1$-$C_{10}$ alkyl group; wherein the compound is a multiple charged cationic compound having 2, 3, or more positive charges. In some embodiments, a use solution of the clay treatment composition reduces clay swelling, clay migration, and sludge formation in the subterranean formation.

In some embodiments, the polyamine is $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000.

The structures of and the reactions leading to the exemplary multiple charged cationic compounds (I) using a linear polyethyleneimine is shown in FIG. 1. The scheme for preparation of exemplary cationic polymer compositions (II) using a branched polyethyleneimine is shown in FIG. 2.

Figure 2:
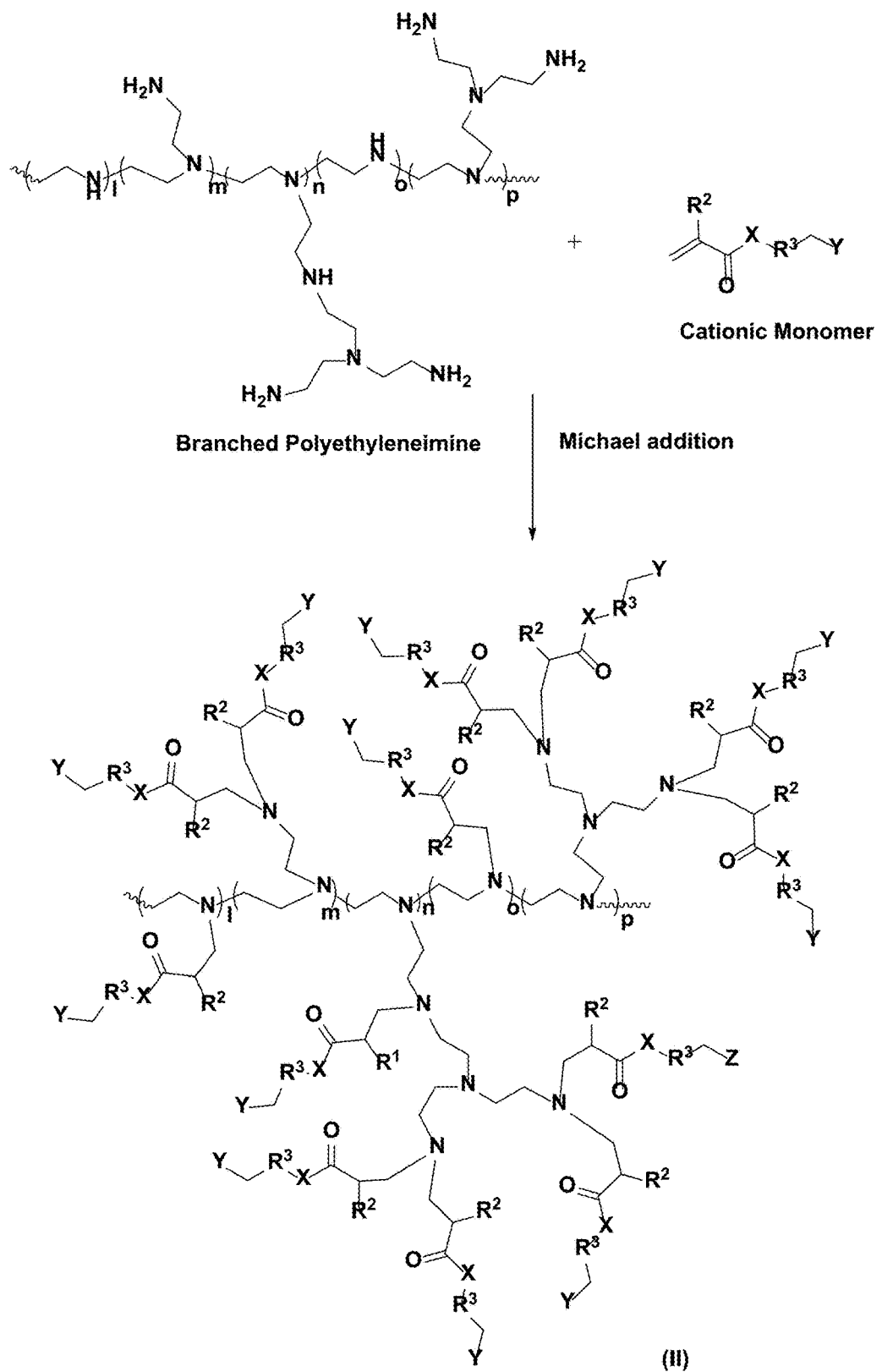
FIG. 2 shows a generic reaction scheme to produce a multiple charged cationic compound by an aza-Michael addition reaction between a branch polyethyleneimine and an α, β-unsaturated carbonyl compound.

In FIG. 1 and FIG. 2, k, l, m, n, o, or p is an integer of 1-100; X is NH or O; $R^2$ is H, $CH_3$, or an unsubstituted, linear or branched $C_2$-$C_{10}$ alkyl group; $R^3$ is absent or an unsubstituted, linear $C_1$-$C_{30}$ alkylene group; Y is —$NR^4R^5R^{6(+)}$ or a salt thereof; $R^4$, $R^5$, and $R^6$ are independently $C_1$-$C_{10}$ alkyl group or benzyl group.

The structures I and II in FIG. 1 and FIG. 2 are depiction of generalized and exemplary reaction products. In structures I and II, all the secondary and primary amines in the polyethyleneimine react with the activated olefins so that no secondary amines remain. It is possible that in the disclosed multiple charged cationic or anionic compounds, some secondary or primary amine groups do not react completely with the activated olefins and remain as primary or secondary amines in multiple charged cationic or anionic compounds or their salts.

In other words, in some embodiments, the multiple charged cationic or anionic compounds have one of the generic formula of $NA_2\text{-}[R^{10'}]_n\text{-}NA_2$, $(RNA)_n\text{-}RNA_2$, $A_2N\text{---}(RNA)_n\text{-}RNA_2$, or $A_2N\text{---}(RN(R'))_n\text{---}RNA_2$, wherein $R^{10'}$ is a linear or branched, unsubstituted or substituted $C_2\text{-}C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4\text{-}C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4\text{-}C_{10}$ alkyl group, $RNA_2$, $RNARNA_2$, or $RN(RNA_2)_2$; n can be from 2 to 1,000,000; A is H or

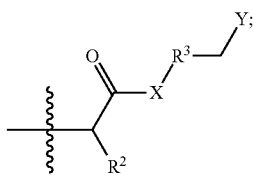

or a combination thereof, each of the compounds contain at least 2 non-proton and cationic A groups, at least 3 non-proton and cationic A groups, at least 4 non-proton and cationic A groups, at least 5 non-proton and cationic A groups, or more than 6 non-proton and cationic

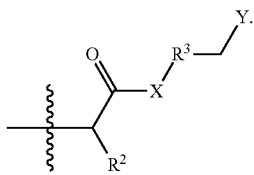

In some embodiments, at least two of the primary $NH_2$ protons are

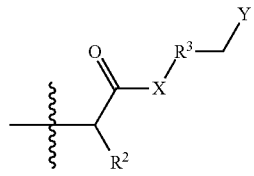

and the rest of primary $NH_2$ protons remains. In some embodiments, some of primary $NH_2$ and secondary NH proton are replaced by

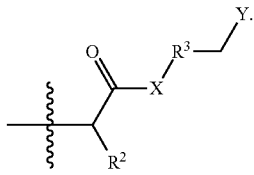

In some embodiments, all of primary $NH_2$ and some of secondary NH proton are replaced by

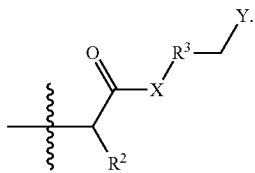

For the reaction described above, water can be used as solvent. However, the use of other solvent and/or diluent for the reaction is optional. When the other solvent or diluent is necessary, a wide range of non-acidic solvents are suitable, such as, for example, acetonitrile, ethers (e.g., tetrahydrofuran (THF)), alcohols (e.g., methanol, ethanol, isopropanol, n-butanol, glycol, PEG, or a mixture) and the like For the reaction above, no additional catalyst was used. Because the reaction to synthesize the disclosed compounds uses a polyamine including one or more primary amine groups, the primary amine groups or the polyamine itself can function as a (base) catalyst for the reaction. However, an additional catalyst is optional. Aza-Michael addition reaction employed for synthesis of compositions claimed can also be catalyzed by a strong acid or base.

For the reaction described above, the reaction can be carried out at 50° C. However, reaction temperature can range from about 20° C. to about 150° C., more preferably from about 50° C. to about 100° C.

In the reaction described above, the polyethyleneimine can be added to the solution of the quat-monomer. However, solution of the quat-monomer could be added to polyethyleneimine or both reagents can be added simultaneously.

In some embodiments, the polyamine is a linear, branched, or dendrimer polyamine with a general formula of —$[RNH]_n$—, wherein R is —$CH_2CH_2$—, —$CH_2CH_2CH_2$—, —$CH(CH_3)CH_2$—, a linear or branched, unsubstituted or substituted $C_4\text{-}C_{10}$ alkylene group, or combination thereof and n is an integer of 3, 4, 5, 6, 7-9, or 10 to 1,000,000.

In some embodiments, the polyamine is a linear, branched, or dendrimer polyamine with a general formula of $(RNH)_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4\text{-}C_{10}$ alkylene group, or combination thereof and n can be from 2 to 1,000,000. In some embodiments, R is the same in each monomer. In some other embodiments, R can be different from one monomer to another monomer.

In some other embodiments, the polyamine is a linear, branched, or dendrimer polyamine with a general formula of $H_2N$—$(RNH)_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4\text{-}C_{10}$ alkylene group, or combination thereof and n can be from 2 to 1,000,000. In some embodiments, R is the same in each monomer. In some other embodiments, R can be different from one monomer to another monomer.

In yet some other embodiments, the polyamine is a linear, branched, or dendrimer polyamine with a general formula of $H_2N$—$(RN(R'))_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4\text{-}C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. In some embodiments, R or R' is the same in each monomer. In some other embodiments, R or R' can be different from one monomer to another monomer.

In some embodiments, the polyamine is one with a general formula of $NH_2$—$[R^{10'}]_n$-Nth, wherein $R^{10'}$ is a linear or branched, unsubstituted or substituted $C_4$-$C_{10}$ alkylene group, or combination thereof and n is an integer of 3, 4, 5, 6, 7-9, or 10 to 1,000,000. In some other embodiments, $R^{10'}$ can be different from one monomer to another monomer.

In some embodiments, the polyamine is one or more of polyamines under JEFFAMINE® by Huntsman.

In some embodiments, the polyamine comprises an alkyleneamine, the alkyleneamine comprising ethylenediamine, diethylenetriamine, triethylenetetramine, tetraethylenepentamine, pentaethylenehexamine, hexaethyleneheptamine, polyethyleneimine, tris(2-aminoethyl)amine, or a mixture thereof.

In some other embodiments, the polyamine is a mixture of monoamine, diamine, and triamine with a polyether backbone or with a polyether backbone based on propylene oxide (PO), ethylene oxide (EO), or a mixture of both oxides.

In some embodiments, the polyamine is an unmodified polyamine. In some other embodiments, the polyamine is a modified polyamine. As used herein, a "modified polyamine" refers to a polyamine in which one or more NH protons is substituted by a non-proton group, such as an alkyl.

In yet some embodiments, the polyamine is an ethoxylated polyamine, propylated polyamine, polyamine with polyquat, polyamine with polyglycerol, or combination thereof.

In yet some other embodiments, the polyamine is a linear, branched, or dendrimer polyethyleneimine. In some other embodiments, the polyamine comprises only primary and secondary amine groups. In some embodiments, the polyamine comprises only primary, secondary, and tertiary amine groups. In some other embodiments, the polyamine comprises only primary and tertiary amine groups.

In some embodiments, the polyamine is a single compound. In some other embodiments, the polyamine is a mixture of two or more different polyamines, wherein the different polyamines have different molecular weight, different structure, or both.

In some embodiments, the polyamine has an average molecular weight ($M_w$) of from about 60 to about 2,000,000 Da. In some other embodiments, the polyamine has an average molecular weight ($M_w$) of from about 60 to about 5,000 Da. In yet some other embodiments, the polyamine has an average molecular weight ($M_w$) of from about 60 to about 25,000 Da.

In some embodiments, the polyamine has an average molecular weight ($M_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, about 2,000,000, or any value there between.

In some embodiments, the polyamine is diamine or triamine having an average molecular weight ($M_w$) of from about 60 to about 4,000 or from about 60 to about 1,300.

In some embodiments, the compound is a mixture derived from a linear polyethyleneimine and (3-Acrylamidopropyl)trimethylammonium chloride (APTAC). In some other embodiments, the compound is a mixture derived from a linear polyethyleneimine and [3-(Methacryloylamino)propyl]trimethylammonium chloride (MAPTAC).

In some other embodiments, the multiple charged cationic compound is a mixture derived from a branched polyethyleneimine and 3-Acrylamidopropyl)trimethylammonium chloride (APTAC). In some other embodiments, the compound is a mixture derived from a linear polyethyleneimine and [3-(methacryloylamino)propyl]trimethylammonium chloride (MAPTAC).

In some embodiments, the α, β-unsaturated carbonyl compound is (3-Acrylamidopropyl)trimethylammonium chloride (APTAC), [3-(Methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEA-MSQ).

In some other embodiments, the α, β-unsaturated carbonyl compound is (3-Acrylamidopropyl)trimethylammonium chloride (APTAC), [3-(Methacryloylamino)propyl]trimethylammonium chloride (MAPTAC), or mixture thereof.

In some other embodiments, the α, β-unsaturated carbonyl compound is 2-(acryloyloxy)-N,N,N-trimethylethanaminium chloride (DMAEA-MCQ), N,N-dimethylaminoethyl acrylate benzyl chloride quaternary salt (DMAEA-BCQ), 2-(methacryloyloxy)-N,N,N-trimethylethan-1-aminium methyl sulfate (DMAEA-MSQ), or a mixture thereof.

In some embodiments of the disclosed compounds herein, X is NH. In some other embodiments, X is O.

In some embodiments, $R^2$ is H. In some embodiments, $R^2$ is $CH_3$. In yet some other embodiments, $R^2$ is $CH_3CH_2$, $CH_2CH_2CH_3$, or $CH(CH_3)_2$.

In some other embodiments, Y is —$NR_4R_5R_6^{(+)}$, and $R^4$, $R^5$, and $R^6$ are independently $CH_3$. In yet some other embodiments, Y is —$NR_4R_5R_6^{(+)}$, and $R^4$ and $R^5$, independently $CH_3$, and $R^6$ is a $C_2$-$C_{12}$ aromatic alkyl. In some other embodiments, Y is —$NR_4R_5R_6^{(+)}$, and $R^4$ and $R^5$, independently $CH_3$, and $R^6$ is —$CH_2$—$C_6H_6$.

In some embodiments, Y is —$NR_4R_5R_6^{(+)}$ and the counter ion for Y is any negative charged ion or species. In some other embodiments, the counter ion for Y is chloride, bromide, fluoride, iodide, acetate, aluminate, cyanate, cyanide, dihydrogen phosphate, dihydrogen phosphite, formate, carbonate, hydrogen carbonate, hydrogen oxalate, hydrogen sulfate, hydroxide, nitrate, nitrite, thiocyanate, or a combination thereof.

In some embodiments, $R^3$ is $CH_2$. In some other embodiments, $R^3$ is $CH_2CH_2$. In other embodiments, $R^3$ is $C(CH_3)_2$. In yet some other embodiments, $R^3$ is an unsubstituted, linear, and saturated $C_1$-$C_{20}$ alkylene group. In some embodiments, $R^3$ is an unsubstituted, linear, and unsaturated $C_1$-$C_{20}$ alkylene group.

In some embodiments, $R^3$ is a linear $C_8$-$C_{18}$ alkyl, alkenyl, or alkynyl group. In some other embodiments, $R^3$ is a branched $C_8$-$C_{20}$ alkyl, alkenyl, or alkynyl group. In some embodiments, the compound is a single multiple charged cationic compound.

In some embodiments, the compound is a mixture of two or more multiple charged cationic compounds, wherein the two or more different compounds differ from other by molecular weight, structure, net charge, or combination thereof.

In some embodiments, the compound is a mixture of at least two different multiple charged cationic compounds derived from the same polyamine and the α, β-unsaturated carbonyl compound.

In some embodiments, the compound is a mixture of two or more different multiple charged cationic compounds derived from different polyamines and the same α, β-unsaturated carbonyl compound.

In some embodiments, the compound is a mixture of two or more different multiple charged cationic compounds derived from different polyamines and different α, β-unsaturated carbonyl compounds.

In some embodiments, the compound has an average molecular weight ($M_w$) of from about 100 to about 2,000,000 Da. In some other embodiments, the compound or modified compound has an average molecular weight ($M_w$) of from about 100 to about 5,500 Da or from about 100 to about 10,000 Da.

In some embodiments, the compound has at least 10, 15, 20, or 30 positive charges. In some other embodiments, the compound has at least 4, 5, 6, 7, or 8 positive charges. In yet some other embodiments, the compound has average net charges of from 3 to 100. In some other embodiments, the compound has average net charges of from 3 to 15.

In some embodiments, the compound has average net charges of from 3 to 100. In some embodiments, the compound has average net charges of from 3 to 15.

In some embodiments, the compound has average net charge of from 3 to 10 and an average molecular weight ($M_w$) of from about 200 to about 500, from about 500 to about 1,000, from about 1,000 to about 2,000, from about 2,000 to about 3,000, from about 3,000, to about 4,000, from about 4,000 to about 5,000, from about 5,000 to about 6,000, from about 6,000 to about 8,000, from about 8,000 to about 10,000, from about 10,000 to about 20,000, from about 20,000 to about 40,000, from about 40,000 to about 80,000, from 80,000 to about 100,000, from 100,000 to about 500,000, or from 500,000 to about 2,000,000.

In some embodiments, the compound has average net charges of from 10 to 30 and an average molecular weight ($M_w$) of from about 200 to about 500, from about 500 to about 1,000, from about 1,000 to about 2,000, to about 3,000, from about 3,000, to about 4,000, or from about 4,000 to about 5,000.

In some other embodiments, $R^2$ is H, X is NH, $R^3$ is $CH_2CH_2$, Y is $CH_2$—$N^+(CH_3)_3Cl^-$.

In some embodiments, the polyamine is ethylenediamine, diethylenetriamine, triethylenetetramine, tetraethylenepentamine, pentaethylenehexamine, hexaethyleneheptamine, polyethyleneimine, tris(2-aminoethyl)amine, or a mixture thereof In some other embodiments, the polyamine is a polyethyleneimine or a mixture of polyethyleneimines. In yet some other embodiments, the polyamine is a polyethyleneimine having an average molecular weight ($M_w$) of from about 1,000 to about 5,000.

In some embodiments, the polyamine is diamine or triamine having an average molecular weight ($M_w$) of from about 130 to about 4,000.

In some embodiments, the compound is soluble or dispersible in water or the clay treatment composition.

In some embodiments, the clay treatment composition further comprises one or more additional clay treatment composition agents.

In some embodiments, the clay treatment composition comprises a carrier, wherein the carrier is water, an organic solvent, or a mixture thereof. In some embodiments, the clay treatment composition further comprises an organic solvent. In some other embodiments, the clay treatment composition further comprises an organic solvent and water.

In some embodiments, the organic solvent is an alcohol, a hydrocarbon, a ketone, an ether, an alkylene glycol, a glycol ether, an amide, a nitrile, a sulfoxide, an ester, or any combination thereof. In some other embodiments, the organic solvent is an alcohol, an alkylene glycol, an alkyleneglycol alkyl ether, or a combination thereof. In yet some embodiments, the organic solvent is methanol, ethanol, propanol, isopropanol, butanol, isobutanol, monoethyleneglycol, ethyleneglycol monobutyl ether, or a combination thereof.

In some embodiments, the organic solvent is methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, a mixture thereof with water, or any combination thereof.

In some embodiments, wherein the clay treatment composition further comprises one or more of corrosion inhibitors. In some embodiments, wherein the clay treatment composition further comprises one or more of corrosion inhibitors and a carrier. In some embodiments, the corrosion inhibitor is an imidazoline compound, a pyridinium compound, or a combination thereof.

In some embodiments, the clay treatment composition further comprises a biocide. In some embodiments, the clay treatment composition further comprises a biocide and carrier. In some other embodiments, the clay treatment composition further comprises a biocide, corrosion inhibitor, and carrier.

In some other embodiments, the biocide is chlorine, hypochlorite, $ClO_2$, bromine, ozone, hydrogen peroxide, peracetic acid, a peroxycarboxylic acid, peroxycarboxylic acid composition, peroxysulphate, glutaraldehyde, dibromonitrilopropionamide, isothiazolone, terbutylazine, polymeric biguanide, methylene bisthiocyanate, tetrakis hydroxymethyl phosphonium sulphate, and any combination thereof.

In some embodiments, the clay treatment composition further comprises an organic sulfur compound. In some other embodiments, wherein the organic sulfur compound is a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof.

In some embodiments, the clay treatment composition further comprises an acid. In some embodiments, the clay treatment composition further comprises an inorganic acid, mineral acid, organic acid, or mixture thereof. In some embodiments, the clay treatment composition comprises from about 1 wt-% to about 20 wt-%, from about 1 wt-% to about 15 wt-%, from about 1 wt-% to about 10 wt-%, from about 1 wt-% to about 5 wt-% of the acid.

In some embodiments, the acid is hydrochloric acid, hydrofluoric acid, citric acid, formic acid, acetic acid, or mixture thereof.

In some embodiments, the clay treatment composition further comprises a hydrogen sulfide scavenger. In some other embodiments, the hydrogen sulfide scavenger is an oxidant, inorganic peroxide, sodium peroxide, chlorine dioxide; a $C_1$-$C_{10}$ aldehyde, formaldehyde, glyoxal, glutaraldehyde, acrolein, or methacrolein, a triazine, monoethanolamine triazine, monomethylamine triazine, or a mixture thereof.

In some embodiments, the clay treatment composition further comprises a surfactant. In some embodiments, the clay treatment composition further comprises a surfactant, biocide, and carrier.

In some embodiments, the surfactant is a nonionic, semi-nonionic, cationic, anionic, amphoteric, zwitterionic, Gemini, di-cationic, di-anionic surfactant, or mixtures thereof.

In some embodiments, the clay treatment composition comprises a nonionic surfactant, particularly alcohol and alkylphenol ethoxylate, cationic, anionic, or amphoteric surfactant, a carrier, or a microemulsions thereof, as flow-back aids.

In some embodiments, the clay treatment composition further comprises a viscosifier. The suitable viscosifiers include, but are not limited to, polysaccharides, particularly sugar and sugar derivatized with glycidyl-bearing molecules, an acrylamide polymer, acrylamide copolymer (with acrylate, AMPS, DMAEA-MCQ, DMAEM-MCQ, MAPTAC, etc.), and viscoelastic surfactant (such as fatty diethanolamide).

In some other embodiments, the clay treatment composition further comprises a viscosifier and crosslinkers. The suitable crosslinkers include, but are not limited to, boron oxide, zirconium oxide, or salt thereof.

In some other embodiments, the clay treatment composition further comprises a friction reducing agent. Suitable friction reducing agents include, but are not limited to, an acrylamide homopolymer, acrylamide (with acrylate, AMPS, DMAEA-MCQ, DMAEM-MCQ, MAPTAC, etc.) copolymer, and alkylene oxide polymer or copolymer.

In some embodiments, the surfactant is an alkyl phenol, fatty acid, or mixture thereof.

In some embodiments, the clay treatment composition further comprises an asphaltene inhibitor, a paraffin inhibitor, a scale inhibitor, a gas hydrate inhibitor, a pH modifier, or any combination thereof.

In some embodiments, the clay treatment composition further comprises a coagulant/flocculant agent, water clarifier, or mixture thereof. In some embodiments, the clay treatment composition further comprises an additional clay stabilizer, carrier, water clarifier, corrosion inhibitor, or mixture thereof.

In some embodiments, the water clarifier is diallyldimethyl ammonium chloride. In some embodiments, the additional clay stabilizer choline chloride, tetramethylammonium chloride, or mixture thereof.

In some embodiments, the clay treatment composition further comprises a dispersant.

In some embodiments, the clay treatment composition further comprises antioxidant, polymer degradation prevention agent, permeability modifier, foaming agent, antifoaming agent, scavenger agent for $CO_2$, and/or $O_2$, gelling agent, lubricant, friction reducing agent, salt, alkalinity source, or mixture thereof.

In some embodiments, the clay treatment composition is a liquid, gel, or a mixture comprising liquid/gel and solid. In some embodiments, the clay treatment composition is a solid or liquid.

In some embodiments, the clay treatment composition or a use solution thereof has a pH of from about 2 to about 11.

A use solution of a clay treatment composition or multiple charged cationic compounds as used herein refers to a diluted solution for the clay treatment composition or compounds by a diluent. A diluent as used herein refers to water, a stimulation fluid, any other fluid used for oil and gas operations, or one of the carriers or solvents defined herein. The clay treatment composition or the compounds can be diluted by a factor of 0.5, 1, 2, 3, 4, 5, 6, 7, 8, 9, 10, 11-1,000,000, or any value there between to generate a use solution and then provide the use solution to a subterranean formation. In this disclosure, when a clay treatment composition or multiple charged cationic compounds are applied, either the composition/compounds or use solution thereof is applied.

In some embodiments, the clay treatment composition further comprises a polymeric, polyquat, another cationic clay stabilizer, or mixture thereof.

In some other embodiments, the clay treatment composition further comprises a low molecular weight inorganic salt, bis-quaternary ammonium compound, or mixture thereof. In some other embodiments, the clay treatment composition further comprises from about 0.1 wt-% to about 10 wt-% of KCl.

In some embodiments, the clay treatment composition is diluted with water to create a use solution of the clay treatment composition, the use solution is then provided into the subterranean formation.

In some other embodiments, the water to dilute the clay treatment composition comprises fresh water, recycled water, salt water, surface water, produced water, or mixture thereof. In some embodiments, the water to dilute the clay treatment composition is a fracturing fluid, acidizing fluid, drilling fluid, drill-in fluid, stimulation fluid, gravel pack fluid, completion fluid, cementing fluid, other oil gas operation fluid, or mixture thereof. Usually, the clay treatment composition or its use solution is injected into the fracturing fluid, acidizing fluid, drilling fluid, drill-in fluid, stimulation fluid, gravel pack fluid, completion fluid, cementing fluid, other oil gas operation fluid, or mixture thereof, before these fluids are injected into the subterranean formation for oil and gas production. In these situations, these fluids are considered to be the use solution of the clay treatment compositions. In some embodiments, the concentration of the multiple charged cationic compound or the clay treatment composition is between about 1 ppm to about 1,000 ppm in these fluids.

In some embodiments, the subterranean formation comprises montmorillonite, smectite, saponite, nontronite, hectorite, and sauconite, kaolin, kaolinite, nacrite, dickite, hydrousmica, hydrobiotite, glauconite, illite and brammallite, chlorite, chamosite, vermiculite, attapulgite, palygoskite, sepiolite or mixture thereof.

In some embodiments, the clay treatment composition comprises from about 10 wt-% to about 80 wt-% of the compound or salt thereof. In some embodiments, the clay treatment composition comprises from about 30 wt-% to about 70 wt-%, from about 20 wt-% to about 40 wt-%, from about 25 wt-% to about 30 wt-%, from about 10 wt-% to about 70 wt-%, from about 30 wt-% to about 60 wt-%, from about 40 wt-% to about 50 wt-%, from about 10 wt-% to about 30 wt-%, from about 20 wt-% to about 40 wt-%, from 30 wt-% to about 50 wt-%, from about 40 wt-% to about 60 wt-%, from about 50 wt-% to 70 wt-%, about 10 wt-%, about 15 wt-%, about 20 wt-%, about 25 wt-%, about 30 wt-%, about 35 wt-%, about 40 wt-%, about 45 wt-%, about 50 wt-%, about 55 wt-%, about 60 wt-%, about 65 wt-%, about 70 wt-%, about 75 wt-%, or any value there between of the compound or salt thereof.

In some embodiments, the clay treatment composition or multiple charged cationic compound(s) disclosed herein has a concentration of from about 1 ppm to about 1000 ppm in the stimulation fluid or any fluid for oil and gas operations. In the other embodiments, wherein the multiple charged cationic compound has a concentration of from about 0.5 ppm to about 100 ppm in the treated stimulation fluid after the clay treatment composition is provided into the stimulation fluid any fluid for oil and gas operations. In yet some other embodiments, the multiple charged cationic compounds disclosed herein has a concentration of from about 5 ppm to about 60 ppm in the stimulation fluid or the fluid for oil and gas operations after the clay treatment composition is applied to the stimulation fluid or the other fluid.

Use of the Methods or Compositions Disclosed

In some embodiments, the clay treatment composition is provided to the stimulation fluid or any other fluid for oil and gas operations independently, simultaneously, or sequentially with one or more additional clay treatment composition agents of the clay treatment composition.

In some embodiments, the clay treatment composition or multiple charged cationic compounds disclosed herein can reduces clay swelling, clay migration, and sludge formation as indicated by the capillary suction time (CST) measurement as described in the Examples section of this disclosure, when the subterranean formation has a multiple charged cationic compound or mixture thereof concentration of from about 1 ppm to about 1,000 ppm, from about 1 to about 900 ppm, from about 1 ppm to about 800 ppm, from about 1 ppm to about 700 ppm, from about 1 ppm to about 600 ppm, from about 1 ppm to about 500 ppm, from about 1 ppm to about 400 ppm, from about 1 ppm to about 300 ppm, from about 1 ppm to about 250 ppm, from about 1 ppm to about 200 ppm, from about 1 ppm to about 150 ppm, from about 1 ppm to about 100 ppm, from about 1 ppm to about 50 ppm, about 950 ppm, about 850 ppm, about 750 ppm, about 650 ppm, about 550 ppm, about 450 ppm, about 350 ppm, about 250 ppm, about 150 ppm, about 50 ppm, or any value there between, after dosing the a subterranean formation with the multiple charged cationic compound or mixture thereof or the clay treatment composition.

In some embodiments, clay treatment compositions are provided to stabilize swellable clays and/or reduce formation of sludge in a subterranean formation. The methods of stabilizing swellable clays and/or reducing formation of sludge in a subterranean formation comprise: providing a clay treatment composition into a subterranean formation, wherein the clay treatment composition comprises a compound or its salt derived from an aza-Michael Addition Reaction between a polyamine and an α, β-unsaturated carbonyl compound according to the following formula

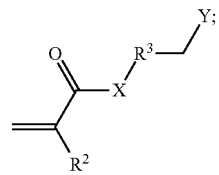

and
one or more clay treatment composition agents, wherein: X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear $C_1$-$C_{30}$ alkylene group; Y is —$NR_4R_5R_6^{(+)}$ or a salt thereof; and $R^4$, $R^5$, and $R^6$ are independently a $C_1$-$C_{10}$ alkyl group, wherein the compound is a multiple charged cationic compound having 2 or more positive charges; and wherein the clay treatment composition stabilizes swellable clays and reduces formation of sludge, or both. In some embodiments, the polyamine is a linear, branched, or dendrimer polyamine with a general formula of $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. In some embodiments, the polyamine is an unmodified polyamine, a modified polyamine, an ethoxylated polyamine, propylated polyamine, polyamine with polyquat, polyamine with polyglycerol, or combination thereof. In some embodiments, the polyamine is a linear, branched, or dendrimer polyethyleneimine. In some embodiments, the polyamine comprises only primary and secondary amine groups; the polyamine comprises only primary, secondary, and tertiary amine groups; or the polyamine comprises only primary and tertiary amine groups.

In further embodiments, the polyamine is one or more of polyamines under the tradename JEFFAMINE® by Huntsman. In still other embodiments: the polyamine is a polyamine with a general formula of $NH_2$—$[R^{10'}]_n$—$NH_2$, wherein $R^{10'}$ is a linear or branched, unsubstituted or substituted $C_2$-$C_{10}$ alkylene group, or combination thereof the polyamine is a polyamine with a general formula of $(RNH)_n$—$RNH_2$ or $H_2N$—$(RNH)_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof the polyamine is a polyamine with a general formula of $H_2N$—$(RN(R'))_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof and R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; the polyamine is diamine or triamine having an average molecular weight ($M_w$) of from about 60 to about 1,300; the polyamine has an average molecular weight of from about 60 to about 2,000,000 Da; and/or the polyamine has an average molecular weight of from about 60 to about 5,000 Da.

In further embodiments, the α, β-unsaturated carbonyl compound has X is NH or O; $R^2$ is H or $CH_3$; Y is —$NR^4R^5R^{6(+)}$, and $R^4$, $R^5$, and $R^6$ are independently $CH_3$; Y is —$NR^4R^5R^{6(+)}$, $R^4$ and $R^5$ are independently $CH_3$, and $R^6$ is a $C_2$-$C_{12}$ aromatic alkyl; Y is —$NR^4R^5R^{6(+)}$, $R^4$ and $R^5$ are independently $CH_3$, and $R^6$ is —$CH_2$—$C_6H_6$; the counter ion for Y is chloride, bromide, fluoride, iodide, acetate, aluminate, cyanate, cyanide, dihydrogen phosphate, dihydrogen phosphite, formate, hydrogen carbonate, hydrogen oxalate, hydrogen sulfate, hydroxide, nitrate, nitrite, thiocyanate, or a combination thereof; $R^3$ is $CH_2$, —$CH_2CH_2$—, —$CH_2CH_2CH_2$— or —$C(CH_3)_2$—; $R^3$ is an unsubstituted, linear, and saturated (or unsaturated) $C_1$-$C_{20}$ alkylene group; $R^3$ is a linear $C_8$-$C_{18}$ alkyl, alkenyl, or alkynyl group; and/or $R^3$ is a branched $C_8$-$C_{20}$ alkyl, alkenyl, or alkynyl group.

In further embodiments, the α, β-unsaturated carbonyl compound is (3-Acrylamidopropyl)trimethylammonium chloride (APTAC) or [3-(Methacryloylamino)propyl]trimethylammonium chloride (MAPTAC); and/or the α, β-unsaturated carbonyl compound is (3-Acrylamidopropyl)trimethylammonium chloride (APTAC), [3-(methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEA-MSQ).

In some embodiments of the methods, the stabilizing swellable clays and/or reducing formation of sludge are in a subterranean formation, In some embodiments, the compound is a single molecule; the compound is a mixture of at least two multiple charged cationic compounds; or the compound is a mixture of at least two multiple charged cationic compounds derived from the same polyamine and the α, β-unsaturated carbonyl compound.

In some embodiments, the product is a mixture of at least two multiple charged cationic compounds derived from different polyamines and the same α, β-unsaturated carbonyl compound; or the product is a mixture of at least two multiple charged cationic compounds derived from different polyamines and different α, β-unsaturated carbonyl compounds. In some embodiments, the compound has an average molecular weight of from about 100 to about 2,000,000 Da; or from about 100 to about 5,500 Da. In further embodiments, the compound has at least 10, 15, 20, or 30 positive charges; or the compound has at least 4, 5, 6, 7, or 8 positive charges. In further embodiments, the compound is one or more of wherein n=0-1000; the compound is

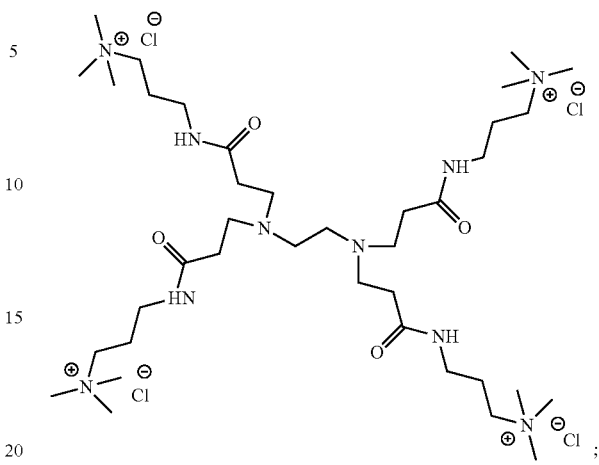

or the compound is

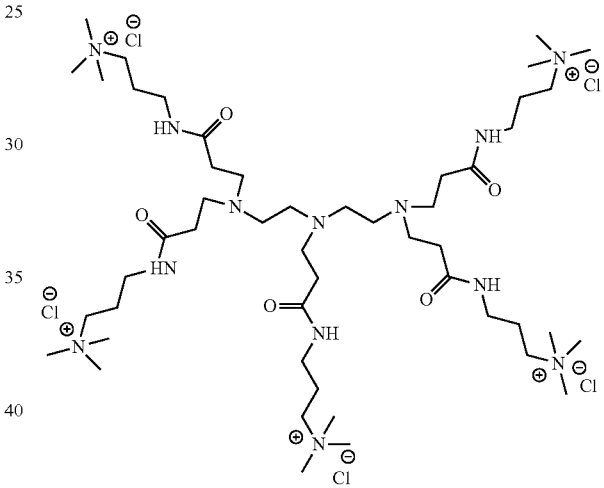

or the compound is

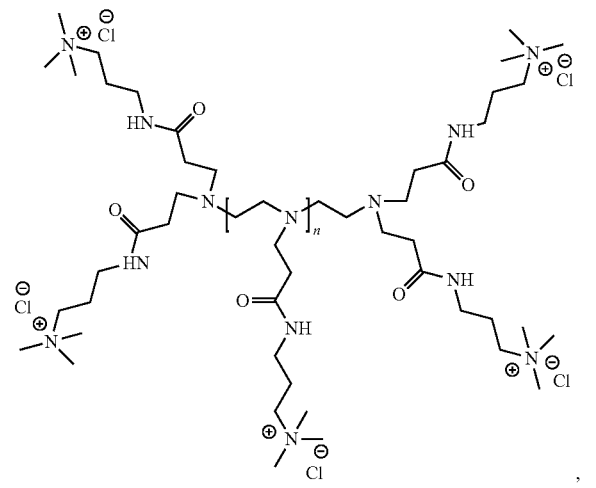

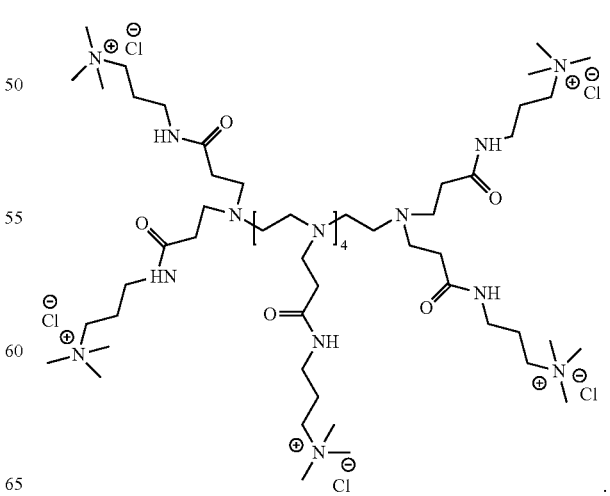

In some embodiments, the compound is derived from a polyethyleneimine and (3-Acrylamidopropyl)trimethylammonium chloride (APTAC), wherein the polyethyleneimine is a linear PEI and has an average molecular weight ($M_w$) of about 5,000. In still further embodiments, the compound is derived from a polyethyleneimine and (3-Acrylamidopropyl)trimethylammonium chloride (APTAC), wherein the polyethyleneimine is a linear PEI and has an average molecular weight ($M_w$) of about 750,000. In still further embodiments, the compound is derived from a polyethyleneimine and (3-Acrylamidopropyl)trimethylammonium chloride (APTAC), wherein the polyethyleneimine is a branched PEI and has an average molecular weight ($M_w$) of about 25,000. In various embodiments, the compound is soluble in water.

In some embodiments, the clay treatment composition further comprises a carrier comprising one or more of water, an alcohol, an alkylene glycol, an alkyleneglycol alkyl ether, or a combination thereof. In some embodiments, the carrier is water, methanol, ethanol, propanol, isopropanol, butanol, isobutanol, monoethyleneglycol, ethyleneglycol monobutyl ether, or a combination thereof.

In some embodiments, the clay treatment composition further comprises one or more of additional functional ingredients, wherein the additional functional ingredient is a flowback aid, friction reducing agent, crosslinker, additional clay stabilizer, viscosifier, reverse emulsion breaker, coagulant/flocculant agent, biocide, corrosion inhibitor, antioxidant, polymer degradation prevention agent, permeability modifier, foaming agent, antifoaming agent, emulsifying agent, fracturing proppant, glass particulate, sand, fracture proppant/sand control agent, scavenger for $H_2S$, $CO_2$, and/or $O_2$, gelling agent, lubricant, salt thereof, or mixture thereof.

In some embodiments the clay treatment composition further comprises an acid from about 1 wt-% to about 20 wt-%, wherein the acid is hydrochloric acid, hydrofluoric acid, citric acid, formic acid, acetic acid, or mixture thereof. In further embodiments, the clay treatment composition further comprises an alkyl phenol, fatty acid, or mixture thereof. In further embodiments, the clay treatment composition further comprises a surfactant, wherein the surfactant is a nonionic, semi-nonionic, cationic, anionic, amphoteric, zwitterionic, Gemini, di-cationic, di-anionic surfactant, or mixtures thereof. In further embodiments, the clay treatment composition further comprises a polymer, polymeric polyquat, or another cationic clay stabilizer. In further embodiments, the clay treatment composition further comprises a bis-quaternary ammonium compound or salt thereof.

In further embodiments, the clay treatment composition contacts the subterranean formation independently, simultaneously, or sequentially with the additional functional ingredient. In some embodiments, the additional functional ingredient contacts the subterranean formation with the multiple charged compound in the treatment composition or through an additional composition.

In further embodiments, the treatment composition further comprises water, including fresh water, recycled water, salt water, surface water, produced water, or mixture thereof. In some embodiments, the clay treatment composition is a fracturing fluid, acidizing fluid, drilling fluid, drill-in fluid, stimulation fluid, gravel pack fluid, completion fluid, cementing fluid, or other oil and gas operation fluid. In some embodiments, the clay treatment composition has a pH of from about 2 to about 11.

In some embodiments, the swellable clays comprises montmorillonite, smectite, saponite, nontronite, hectorite, and sauconite, kaolin, kaolinite, nacrite, dickite, hydrousmica, hydrobiotite, glauconite, illite and brammallite, chlorite, chamosite, vermiculite, attapulgite, palygoskite, sepiolite or mixture thereof.

In some embodiments, the clay treatment composition is a liquid, gel, or a mixture comprising liquid/gel and solid. In further embodiments, the clay treatment composition comprises from about 40 wt-% to about 60 wt-% of the multiple charged cationic compound or its salt.

EXAMPLES

Embodiments of the present disclosure are further defined in the following non-limiting Examples. These Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

Synthesis of Multiple Charged Cationic Compound 1

(3-Acrylamidopropyl) trimethylammonium chloride (APTAC, 75%, 199 grams) and water (20 grams) were charged into a 250-mL three-necked RBF equipped with magnetic stir bar, temperature probe, and condenser. Ethylenediamine (EDA, 99%, 11 grams) was then added to the well-stirred reaction mixture at room temperature. Reaction temperature was raised to 80° C. and stirred overnight or until the >98% consumption of APTAC. The progression of reaction was monitored by ESI-MS and/or NMR spectroscopy for consumption of the monomer. The resulting aqueous solution of Compound 1 was used as-is for its application as clay stabilization agent.

Example 2

Synthesis of Multiple Charged Cationic Compound 2

(3-Acrylamidopropyl) trimethylammonium chloride (APTAC, 75%, 130 grams) and water (20 grams) were charged into a 250-mL three-necked RBF equipped with magnetic stir bar, temperature probe, and condenser. Diethylenetriamine (DETA, 10 grams) was then added to the well-stirred reaction mixture at room temperature. Reaction temperature was raised to 80° C. and stirred overnight or until the >98% consumption of APTAC. The resulting aqueous solution of Compound 2 was used as-is for application testing.

Example 3

Synthesis of Multiple Charged Cationic Compound 3

(3-Acrylamidopropyl) trimethylammonium chloride (APTAC, 75%, 70 grams) and water (20 grams) were charged into a 250-mL three-necked RBF equipped with magnetic stir bar, temperature probe, and condenser. Pentaethylenehexamine (PEHA, 10 grams, 99%) was then added to the well-stirred reaction mixture at room temperature. Reaction temperature was raised to 80° C. and stirred overnight or until the >98% consumption of APTAC. The resulting aqueous solution of Compound 3 was used as-is for application testing.

Example 4

Synthesis of Multiple Charged Cationic Compound 4

(3-Acrylamidopropyl) trimethylammonium chloride (APTAC, 75%, 216 grams) was charged into a 250-mL three-necked RBF equipped with magnetic stir bar, temperature probe, and condenser. Tris(2-aminoethyl)amine (95%, 216 grams) was then added to the well-stirred reaction mixture at room temperature. Reaction temperature was raised to 80° C. and stirred overnight or until the >98% consumption of APTAC. The resulting aqueous solution of Compound 4 was used as-is for application testing.

Example 5

Synthesis of Multiple Charged Cationic Compound 5

Ethyleneamine E-100 from Huntsman was used for this reaction. E-100 is a mixture of tetraethylenepentamine (TEPA), pentaethylenehexamine (PEHA), hexaethyleneheptamine (HEHA), and other higher molecular weight amines. E-100 is a complex mixture of various linear, cyclic, and branched amines with a number-average molecular weight (Mn) of 250-300 g/mole.

(3-Acrylamidopropyl) trimethylammonium chloride (APTAC, 75%, 60 grams) was charged into a 250-mL three-necked RBF equipped with magnetic stir bar, temperature probe, and condenser. Ethyleneamine E-100 (12 grams) was then added to the well-stirred reaction mixture at room temperature. Reaction temperature was raised to 80° C. and stirred overnight or until the >98% consumption of APTAC. The resulting aqueous solution of Compound 5 was used as-is for application testing.

Example 6

Synthesis of Multiple Charged Cationic Compound 6

BASF Lupasol G20 (50% aqueous solution of polyethyleneimine with a weight-average molecular weight ($M_w$) around 1,300 g/mole) was used for this reaction.

(3-Acrylamidopropyl) trimethylammonium chloride (APTAC, 75%, 78.55 grams) was charged into a 250-mL three-necked RBF equipped with magnetic stir bar, temperature probe, and condenser. Lupasol G20 (50%, 50 grams) was then added to the well-stirred reaction mixture at room temperature. Reaction temperature was raised to 80° C. and stirred overnight or until the >98% consumption of APTAC. The resulting aqueous solution of Compound 6 was used as-is for its application as clay stabilization agent.

Example 7

Synthesis of Multiple Charged Cationic Compound 7

BASF Lupasol G100 (50% aqueous solution of a polyethyleneimine with a weight-average molecular weight ($M_w$) around 5000 g/mole) was used for this reaction.

(3-Acrylamidopropyl) trimethylammonium chloride (APTAC, 75%, 72.4 grams) was charged into a 250-mL three-necked RBF equipped with magnetic stir bar, temperature probe, and condenser. Lupasol G100 (50%, 50 grams) was then added to the well-stirred reaction mixture at room temperature. Reaction temperature was raised to 80° C. and stirred overnight or until the >98% consumption of APTAC. The resulting aqueous solution of Compound 7 was used as-is for its application as clay stabilization agent.

Example 8

Effect of Some Exemplary Multiple Charged Cationic Compounds For Preventing Clay Swelling The efficacy of some exemplary multiple charged cationic compounds was tested for preventing clay swelling by Capillary Suction Timer (CST) method, an industry accepted standard method. Testing was conducted at effective concentration of 0.1 wt % of compounds.

Capillary suction time (CST) measurement is used as a rapid screening test for clay formation-stabilizing chemical additives. CST is a static filtration test that is used to measure the permeability of a filter cake that forms at the interface of a slurry and chromatographic paper. The fine particulate material adsorbs and retains water more effectively, forms tighter filter cakes, and more easily moves into the pore space of the paper, thereby hindering the flow of water from the slurry into the paper. Coarse and coagulated particulates, by contrast, will form a looser filter cake with larger intra-particle spacing, and will not be able to fit into the paper pores and clog them, thereby yielding faster flow through the paper.

The flow of water through the paper is measured using a set of three electrodes that are placed in contact with the paper at fixed distances from the slurry-containing metal funnel. Two of the electrodes are closer.

The flow of water through the paper is measured using a set of three electrodes that are placed in contact with the paper at fixed distances from the slurry-containing metal funnel. Two of the electrodes are closer and equidistant from the funnel, the third electrode is placed at a greater distance from the funnel and equidistant from the first two electrodes.

As water permeates the paper, it eventually reaches the two nearer electrodes; the conductivity of the water will allow for current to pass between them, triggering a timer mechanism. As the water continues to permeate through the paper, it will eventually reach the third and outer electrode, ending the time measurement.

The measured time reflects the properties of both the solid and liquid in the slurry, depending on their cumulative impact on filter cake formation and flow through microscale pores. Individual tests, not including preparation and cleanup time, range from tens of seconds to minutes. When measuring with water and variable formation materials, shorter times typically reflect reduced need for clay or formation stabilization, and longer measured times reflect increased need for stabilization. If the formation material is held constant and the fluid is varied, lower times reflect improved clay and formation stabilization properties.

Ideally, actual solids from the point of chemical application are collected for testing. Unfortunately, these solids are not typically suitable for a laboratory test. Drill cuttings are the most frequently sampled solids, but such materials have been extensively modified and degraded both mechanically and chemically, leaving the materials poorly representative of the native rock. To avoid this problem, an alternative was adopted for testing a compound or composition's efficacy for preventing clay swelling. This alternate method uses clay formation "surrogates" that is recreated using pure minerals (Table 2) that are selected based on their representativeness and ease of procurement. Using this approach, robust and moderate-precision (~10% or less relative standard deviation) data can be generated to evaluate a compound or composition's efficacy to prevent clay swelling for any formation.

TABLE 2

Mineral classes of frequently-encountered native minerals in oil and gas reservoirs, common minerals within each class, and the surrogate minerals selected for representation of each native mineral.

| Mineral class | Common native minerals | Surrogate mineral |
| --- | --- | --- |
| Tectosilicates | Quartz | Silica |
| | Feldspars | |
| Other | Pyrite, marcasite | Silica |
| | Apatite, gypsum, anhydrite | Calcite |
| Carbonates | Calcite, dolomite, siderite, ankerite | Calcite |

TABLE 2-continued

Mineral classes of frequently-encountered native minerals in oil and gas reservoirs, common minerals within each class, and the surrogate minerals selected for representation of each native mineral.

| Mineral class | Common native minerals | Surrogate mineral |
| --- | --- | --- |
| Phyllosilicates (clays) | [Non-swelling] Illite, mica, kaolinite, chlorite | Kaolinite |
| | [Swelling] Smectite | Bentonite |

The CST test therefore begins with the identification of the target formation mineral composition. A target formation is analyzed, typically based on a sample of drill cuttings that have been cleaned and dried. The composition is identified using quantitative X-ray diffraction (XRD) methods that include phyllosilicate (clay) speciation, yielding mass fractions of the various minerals that comprise the sample. The determined composition is then used to create a "surrogate" that matches the original target composition as much as possible, using the classification scheme shown in Table 3, by weighing out the propriate amount of each surrogate mineral and mixing them well in a container.

The clay treatment compositions can be prepared by standard procedures. For each CST measurement, 1 gram of the surrogate is treated with 4.0 mL of a solution of the tested composition. Usually, after mixing the solution with the surrogate mineral in a container for an hour, during which the mixture should be vortexed a few times, the mixture is then vortexed again and then immediately poured into the funnel of the CST measuring device for its CST measurement. For each solution, three independent measurements were taken.

The data is summarized Table 4. The lower the CST value the better the clay control product.

TABLE 3

List of the exemplary multiple charged cationic compounds tested for clay treatment.

| Sample ID | Structure |
| --- | --- |
| Compound 1 | Ethylenediamine-APTAC adduct |

TABLE 3-continued

List of the exemplary multiple charged cationic compounds tested for clay treatment.

| Sample ID | Structure |
|---|---|
| Compound 2 | DETA-APTAC adduct |
| Compound 3 | PEHA-APTAC adduct |

TABLE 3-continued

List of the exemplary multiple charged cationic compounds tested for clay treatment.

| Sample ID | Structure |
|---|---|
| Compound 4 | Tris(2-aminoethyl)amine-APTAC adduct |

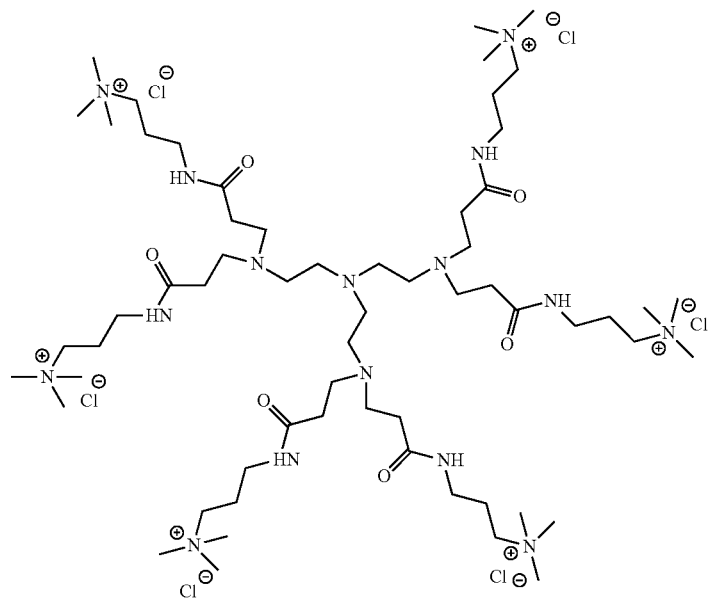

| | |
|---|---|
| Compound 5 | Ethyleneamine E-100-APTAC adduct (Mixture of tetraethylenepentamine (TEPA), pentaethylenehexamine (PEHA), hexaethyleneheptamine (HEHA)) |

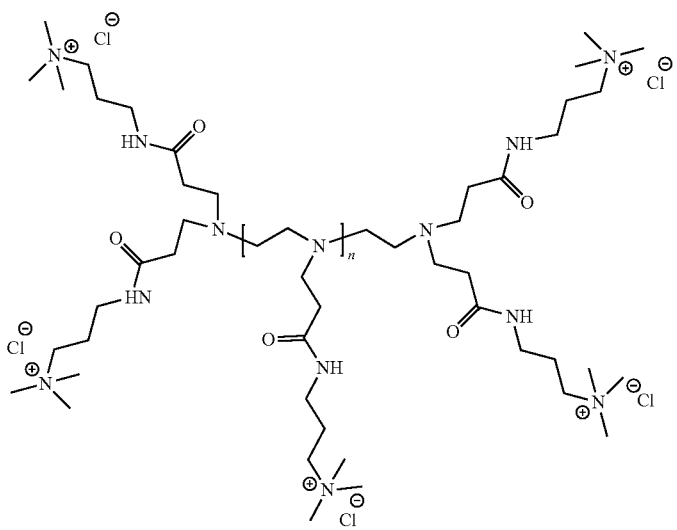

| | |
|---|---|
| Compound 6 | Polyethylenimine; MW 1300 (BASF-Lupasol G20)-APTAC Adduct |
| Compound 7 | Polyethylenimine; MW 5000 (BASF-Lupasol G100)-APTAC Adduct |

TABLE 4

Capillary Suction Time (CST) for the exemplary multiple charged compounds

| Sample ID | Sample Description (concentration) | Capillary suction time (CST) (s) | Stdev |
|---|---|---|---|
| Compound 1 | EDA - APTAC (0.1%) | 50 | |
| Compound 2 | DETA - APTAC (0.1%) | 48 | |
| Compound 3 | PEHA - APTAC (0.1%) | 41 | |
| Compound 4 | Tris(2-aminomethyl)amine-APTAC (0.1%) | 47 | |
| Compound 5 | E-100 - APTAC (0.1%) | 50 | |
| Compound 6 | G-20 - APTAC (0.1%) | 46 | |
| Compound 7 | G-100 - APTAC (0.1%) | 69 | |
| | KCl (2%) | 67 | 6 |
| | Choline chloride (0.1%) | 76 | 2 |
| | Fresh water | 90 | 3 |

The disclosures being thus described, it will be obvious that the same may be varied in many ways. Such variations are not to be regarded as a departure from the spirit and scope of the disclosures and all such modifications are intended to be included within the scope of the following claims.

What is claimed is:

1. A method of stabilizing swellable clays and/or reducing formation of sludge in a subterranean formation comprising:
   providing a clay treatment composition into a subterranean formation,
   wherein the clay treatment composition comprises a compound or its salt derived from an aza-Michael Addition Reaction between a polyamine and an α, β-unsaturated carbonyl compound according to the following formula

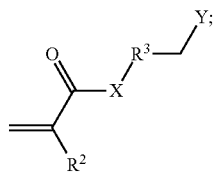

and
one or more clay treatment composition agents,
wherein:
   X is NH or O;
   $R^2$ is H, $CH_3$, or an unsubstituted, linear or branched $C_2$-$C_{10}$ alkyl, alkenyl, or alkynyl group;
   $R^3$ is absent or an unsubstituted, linear $C_1$-$C_{30}$ alkylene group;
   Y is —$NR^4R^5R^{6(+)}$ or a salt thereof,
   wherein (A) $R^4$, $R^5$, and $R^6$ are independently $CH_3$; (B) $R^4$ and $R^5$ are independently $CH_3$, and $R^6$ is a $C_2$-$C_{12}$ aromatic alkyl; or (C) $R^4$ and $R^5$ are independently $CH_3$, and $R^6$ is —$CH_2$—$C_6H_6$,
   wherein the compound is a multiple charged cationic compound having 2 or more positive charges; and
   wherein the clay treatment composition stabilizes swellable clays and/or reduces formation of sludge.

2. The method according to claim 1, wherein the polyamine is a linear, branched, or dendrimer polyamine with a general formula of $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000.

3. The method according to claim 1, wherein the polyamine (A) is an ethoxylated polyamine, propylated polyamine, polyamine with polyquat, polyamine with polyglycerol, or combination thereof, (B) is a linear, branched, or dendrimer polyethyleneimine, (C) comprises only primary and secondary amine groups, (D) comprises only primary, secondary, and tertiary amine groups, and/or (E) comprises only primary and tertiary amine groups.

4. The method according to claim 1, wherein the polyamine (A) has a general formula of $NH_2$—$[R^{10'}]_n$—$NH_2$, wherein $R^{10'}$ is a linear or branched, unsubstituted or substituted $C_2$-$C_{10}$ alkylene group, or combination thereof; (B) has a general formula of $(RNH)_n$—$RNH_2$ or $H_2N$—$(RNH)_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; (C) has a general formula of $H_2N$—$(RN(R'))_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof and R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$.

5. The method according to claim 1, wherein the polyamine (A) is diamine or triamine having an average molecular weight ($M_w$) of from about 60 to about 1,300; or (B) has an average molecular weight of from about 60 to about 2,000,000 Da.

6. The method according to claim 1, wherein X is NH or O and/or $R^2$ is H or $CH_3$.

7. The method according to claim 1, wherein $R^4$, $R^5$, and $R^6$ are independently $CH_3$.

8. The method according to claim 1, wherein the counter ion for Y is chloride, bromide, fluoride, iodide, acetate, aluminate, cyanate, cyanide, dihydrogen phosphate, dihydrogen phosphite, formate, hydrogen carbonate, hydrogen oxalate, hydrogen sulfate, hydroxide, nitrate, nitrite, thiocyanate, or a combination thereof.

9. The method according to claim 1, wherein $R^3$ is $CH_2$, —$CH_2CH_2$—, —$CH_2CH_2CH_2$— or —$C(CH_3)_2$—, an unsubstituted, linear, and saturated $C_1$-$C_{20}$ alkylene group, an unsubstituted, linear, and unsaturated $C_1$-$C_{20}$ alkylene group, a linear $C_8$-$C_{18}$ alkyl, alkenyl, or alkynyl group, or a branched $C_8$-$C_{20}$ alkyl, alkenyl, or alkynyl group.

10. The method according to claim 1, wherein the α, β-unsaturated carbonyl compound is (3-Acrylamidopropyl)trimethylammonium chloride (APTAC), [3-(methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEA-MSQ).

11. The method according to claim 1, wherein the polyamine has an average molecular weight ($M_w$) of from about 60 to about 2,000,000 Da.

12. The method according to claim 1, wherein the compound has an average molecular weight of from about 100 to about 2,000,000 Da and is (A) a single molecule, (B) a mixture of at least two multiple charged cationic compounds, or (C) a mixture of at least two multiple charged cationic compounds derived from the same polyamine and the α, β-unsaturated carbonyl compound, and wherein the product is (AA) a mixture of at least two multiple charged cationic compounds derived from different polyamines and the same α, β-unsaturated carbonyl compound, or (BB) a mixture of at least two multiple charged cationic compounds derived from different polyamines and different α, β-unsaturated carbonyl compounds.

13. The method according to claim 1, wherein the compound has at least 4, 5, 6, 7, 8, 10, 15, 20, or 30 positive charges.

14. The method according to claim 1, wherein the compound is one or more of

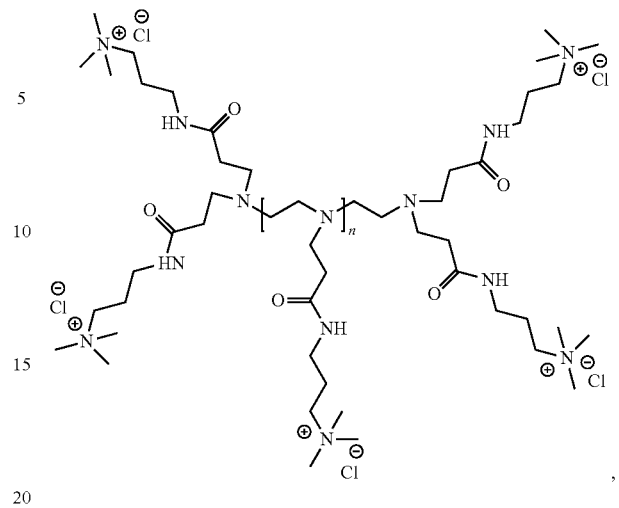

wherein n=0-1000,

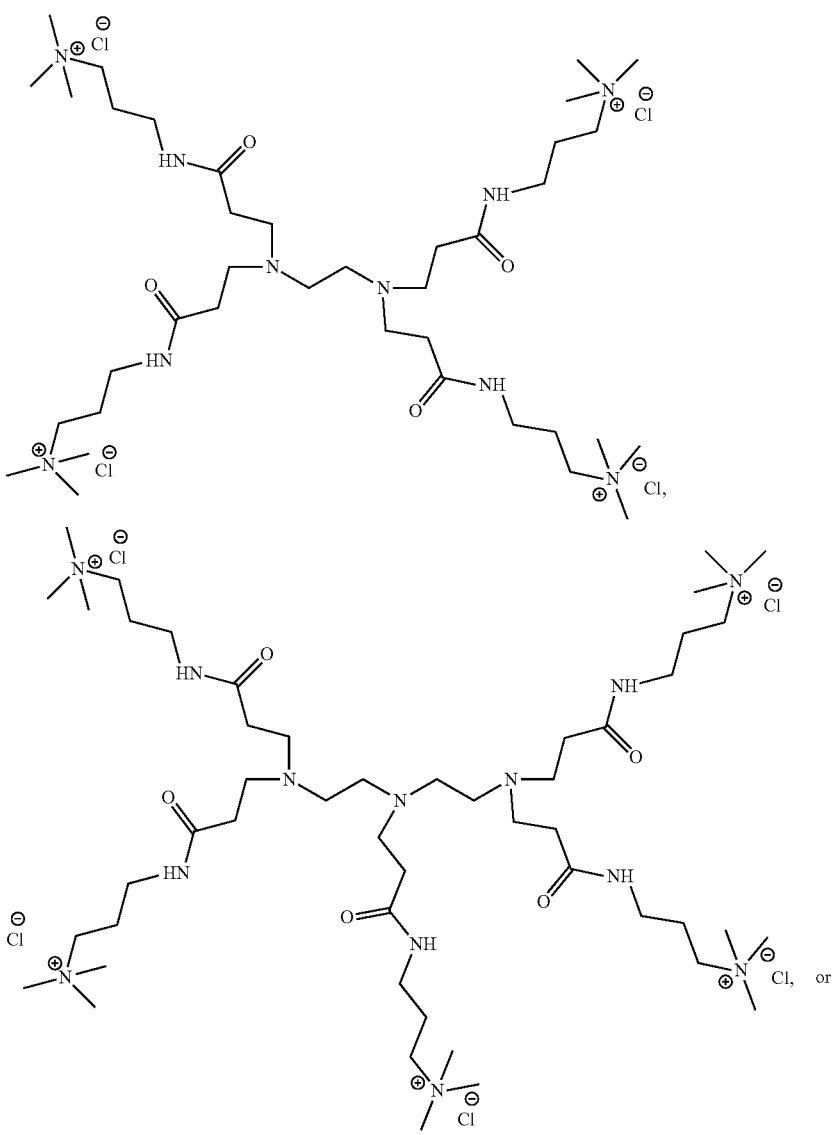

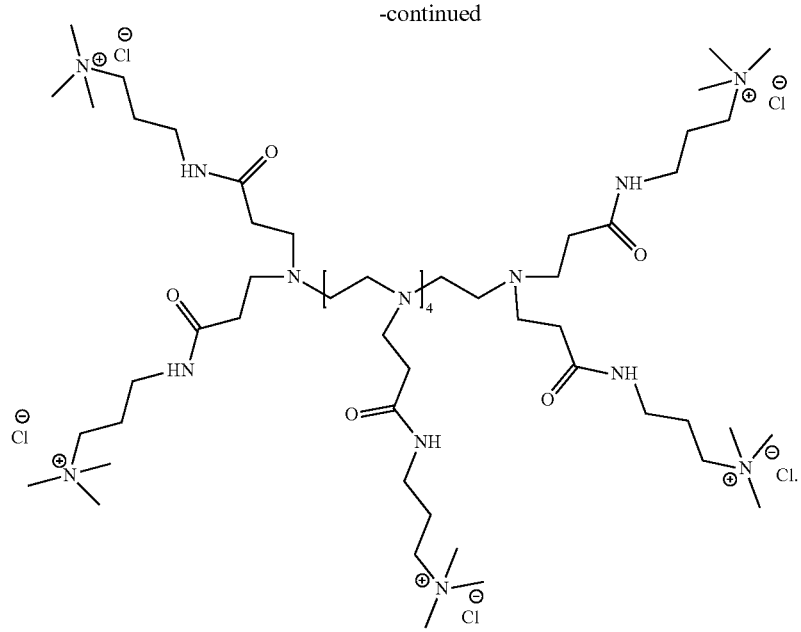

15. The method according to claim 1, wherein the compound is soluble in water.

16. The method according to claim 1, wherein the clay treatment composition further comprises a carrier that is water, an alcohol, an alkylene glycol, an alkyleneglycol alkyl ether, or a combination thereof.

17. The method according to claim 1, wherein the clay treatment composition further comprises one or more of additional functional ingredients that is a flowback aid, friction reducing agent, crosslinker, additional clay stabilizer, viscosifier, reverse emulsion breaker, coagulant/flocculant agent, biocide, corrosion inhibitor, antioxidant, polymer degradation prevention agent, permeability modifier, foaming agent, antifoaming agent, emulsifying agent, fracturing proppant, glass particulate, sand, fracture proppant/sand control agent, scavenger for $H_2S$, $CO_2$, and/or $O_2$, gelling agent, lubricant, salt thereof, or a mixture thereof.

18. The method according to claim 17, wherein the clay treatment composition contacts the subterranean formation independently, simultaneously, or sequentially with the additional functional ingredient, or wherein the additional functional ingredient contacts the subterranean formation with the multiple charged compound in the treatment composition or through an additional composition.

19. The method according to claim 1, wherein the clay treatment composition further comprises: an acid, wherein the acid is hydrochloric acid, hydrofluoric acid, citric acid, formic acid, acetic acid, or mixture thereof; an alkyl phenol, fatty acid, or mixture thereof; a surfactant, wherein the surfactant is a nonionic, semi-nonionic, cationic, anionic, amphoteric, zwitterionic, Gemini, di-cationic, di-anionic surfactant, or mixtures thereof; a polymer, polymeric polyquat, or another cationic clay stabilizer; and/or a bis-quaternary ammonium compound or salt thereof.

20. The method according to claim 1, wherein the treatment composition further comprises water that is fresh water, recycled water, salt water, surface water, produced water, or a mixture thereof.

21. The method according to claim 1, wherein the clay treatment composition is a fracturing fluid, acidizing fluid, drilling fluid, drill-in fluid, stimulation fluid, gravel pack fluid, completion fluid, cementing fluid, or other oil and gas operation fluid.

22. The method according to claim 1, wherein the clay treatment composition has a pH of from about 2 to about 11, and is a liquid, gel, or a mixture comprising liquid/gel and solid.

23. The method according to claim 1, wherein the swellable clays comprises montmorillonite, smectite, saponite, nontronite, hectorite, and sauconite, kaolin, kaolinite, nacrite, dickite, hydrousmica, hydrobiotite, glauconite, illite and brammallite, chlorite, chamosite, vermiculite, attapulgite, palygoskite, sepiolite or mixtures thereof.

24. The method according to claim 1, wherein the clay treatment composition comprises from about 40 wt-% to about 60 wt-% of the multiple charged cationic compound or its salt.

* * * * *

UNITED STATES PATENT AND TRADEMARK OFFICE
CERTIFICATE OF CORRECTION

PATENT NO. : 11,084,974 B2  
APPLICATION NO. : 16/554805  
DATED : August 10, 2021  
INVENTOR(S) : Ashish Dhawan et al.

Page 1 of 1

It is certified that error appears in the above-identified patent and that said Letters Patent is hereby corrected as shown below:

In the Claims

In Claim 1, Column 53, at approximately Lines 35-45, should read:

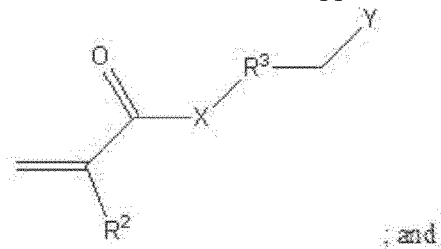 ; and

Signed and Sealed this  
Fifteenth Day of April, 2025

Coke Morgan Stewart  
*Acting Director of the United States Patent and Trademark Office*